(12) United States Patent
Tarver, III

(10) Patent No.: US 6,425,445 B1
(45) Date of Patent: *Jul. 30, 2002

(54) ENHANCED MINIMUM TILLAGE PLANTER/RENOVATOR SYSTEM

(76) Inventor: Sam A. Tarver, III, 84636 Hwy. 25, Folsom, LA (US) 70437

(*) Notice: Subject to any disclaimer, the term of this patent is extended or adjusted under 35 U.S.C. 154(b) by 0 days.

This patent is subject to a terminal disclaimer.

(21) Appl. No.: 09/661,247

(22) Filed: Sep. 13, 2000

Related U.S. Application Data

(63) Continuation-in-part of application No. 09/475,762, filed on Dec. 30, 1999, now Pat. No. 6,257,344, which is a continuation of application No. 09/169,496, filed on Oct. 9, 1998, now Pat. No. 6,009,955, which is a continuation-in-part of application No. 08/829,439, filed on Mar. 28, 1997, now Pat. No. 5,819,855.
(60) Provisional application No. 60/199,642, filed on Apr. 25, 2000, and provisional application No. 60/014,248, filed on Mar. 28, 1996.

(51) Int. Cl.[7] ........................... A01B 49/02; A01B 61/00
(52) U.S. Cl. ..................................................... 172/166
(58) Field of Search ........................ 111/52, 120, 121, 111/122, 140, 135, 186; 172/156, 158, 151, 166, 256, 178, 600, 601, 602, 603

(56) References Cited

U.S. PATENT DOCUMENTS

| | | |
|---|---|---|
| 4,550,122 A | 10/1985 | David et al. |
| 5,027,724 A | 7/1991 | Ptacek et al. |
| 5,477,792 A | 12/1995 | Bassett et al. |
| 5,623,997 A | 4/1997 | Rawson et al. |

Primary Examiner—Robert E. Pezzuto
(74) Attorney, Agent, or Firm—Joseph T Regard Ltd

(57) ABSTRACT

A planter/fertilizer wherein there is provided a ripping point configured to penetrate a predetermined depth into the soil or sod, the ripping point designed to facilitate a splitting and lifting of the soil, forming a seed bed void, while cutting any organic ground cover, which might comprise, for example, sod, widening the ground cover, and lifting same to a prominent head, wherein first and second coulters, situated above and about the ripping point, are configured to independently engage and cut first and second sides of the lifted ground cover, trash and the like, respectively, then cutting the lifted ground cover, etc., as the coulters rotate, the coulters cooperatively grinding at least a portion of the lifted ground cover, forming tilth, and redepositing the tilth into the seedbed void, providing an enhanced seedbed region with nominal surface disturbance, and a clean furrow. Situated behind the first and second mole plows and fertilizer and seed chutes are opposing first and second wheels, the first wheel a larger diameter furrow trimming wheel, having outwardly emanating therefrom a depth ring or drum for controlling the depth and covering of the seed for the first side of the furrow, the second wheel being smaller in diameter than the first and situated to trim the furrow and assist further in covering the seed for the second side of the furrow, the first and second wheels having different diameters so that they cooperatively rotate at different speeds to prevent clogging, and are situated at opposing angles on horizontal and vertical planes so as to be self cleaning in a variety of soil conditions. Following the first and second wheels is a pressure wheel about the width of the furrow, which is directed over the furrow so as to apply pressure to the furrow, flattening so as to complete the furrow forming process.

46 Claims, 18 Drawing Sheets

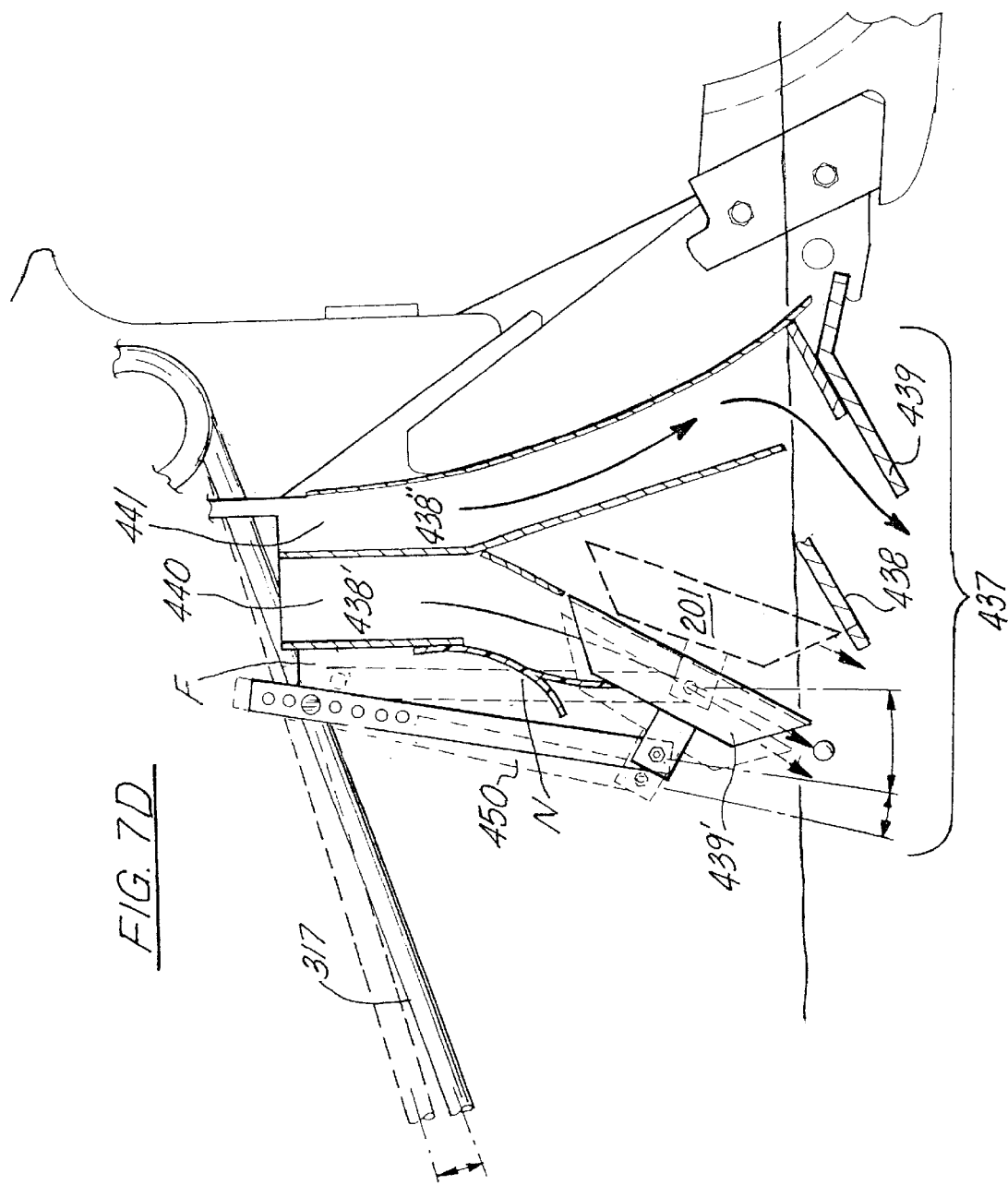

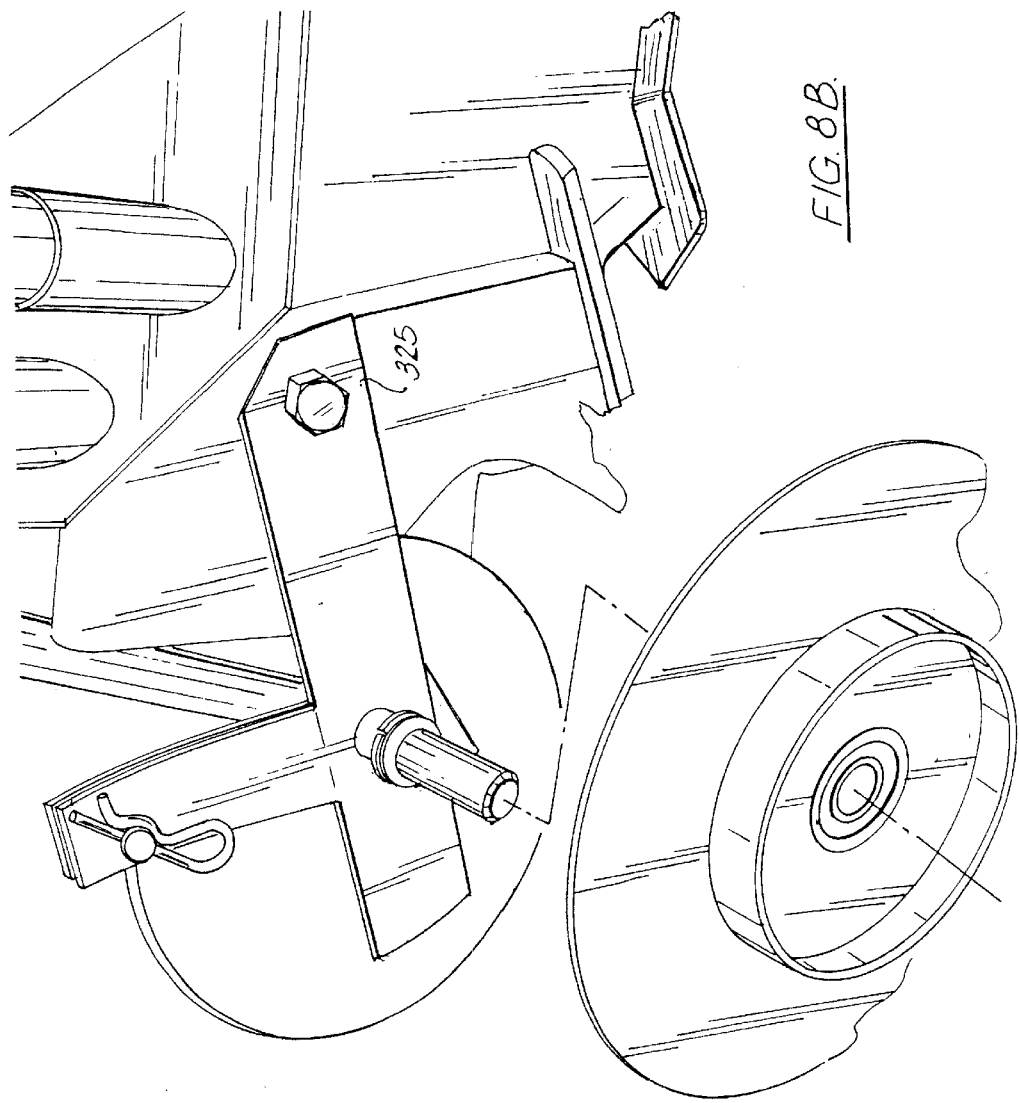

ENHANCED MINIMUM TILLAGE PLANTER/RENOVATOR SYSTEM

STATEMENT OF CONTINUING APPLICATION

The present invention is a continuation-in-part of U.S. Provisional Patent Application Ser. No. 60/199,642. filed Apr. 25, 2000, and patent application Ser. No. 09/475,762, filed Dec. 30, 1999, now U.S. Pat. No. 6,257,344, entitled "Enhanced Minimum Tillage Planter/Renovator System", which is a continuation of patent application Ser. No. 09/169,496, filed Oct. 9, 1998, issuing as U.S. Pat. No. 6,009,955 on Jan. 4, 2000, which is a continuation-in-part of U.S. Provisional Patent Application Number 60/014,248, filed Mar. 28, 1996, listing as the inventor Sam A. Tarver, III, entitled "No Till Heel Mole Plow", and U.S. Utility patent application Ser. No. 08/829,439 filed on Mar. 28, 1997 issued Oct. 13, 1998 as U.S. Pat. No. 5,819,855 entitled "Enhanced Minimum Tillage Planter/Renovator System".

TECHNICAL FIELD of the INVENTION

This invention relates to a cultivation equipment and methods, and in particular to a minimum tillage planting/renovation system configured to facilitate an enhanced seedbed in a variety of soil conditions, while maintaining nominal surface disturbance. The present invention may further be configured, for example, to provide intercrop planting, renovating, and/or fertilizing.

The system of the present invention contemplates a planter/fertilizer wherein there is provided a ripping point configured to penetrate a predetermined depth into the soil or sod, the ripping point designed to facilitate a splitting and lifting of the soil, forming a seed bed void, while cutting any organic ground cover, which might comprise, for example, sod, widening the ground cover, and lifting same to a prominent head, wherein first and second coulters, situated above and about said ripping point, are configured to independently engage and cut first and second sides of the lifted ground cover, trash and the like, respectively, then cutting the lifted ground cover, etc., as the coulters rotate, the coulters cooperatively grinding at least a portion of said lifted ground cover, forming tilth, and redepositing the tilth into the seedbed void, providing an enhanced seedbed region with nominal surface disturbance, and a clean furrow.

First and second mole plows are situated in linear alignment with and behind the ripping point, the first mole plow in front of the second mole plow, with a fertilizer chute situated in the vicinity of the first mole plows, and a seed chute situated behind the second mole plow, for the selective dispensing of fertilizer and seed into the seedbed void during operation of the present invention.

Situated behind the first and second mole plows and fertilizer and seed chutes are opposing first and second wheels, trimming the first side of the furrow, a larger diameter furrow trimming wheel having outwardly emanating therefrom a depth ring or drum for controlling the depth and covering first side of the furrow, the second wheel being smaller in diameter, and lacking the depth ring (the depth is controlled via the depth ring of the first wheel, which supports via support bracket the second wheel) and situated to trim the furrow and assist further in covering the seed for the second side of the furrow, the first and second wheels having different diameters so that they rotate at different speeds to prevent clogging, and are situated at opposing angles on horizontal and vertical planes so as to be self cleaning in a variety of soil conditions.

Following the first and second wheels is a pressure wheel about the width of the furrow, which is directed over the furrow so as to apply pressure to the furrow, completing the furrow forming process.

BACKGROUND OF THE INVENTION

The general concept of minimum tillage planter/renovators is not new, and many patents have issued over the years for various attempts at providing an enhanced seedbed, without the necessity of disturbing the ground surface, which might comprise, for example, sod or the like.

However, when conventional minimum tillage planters are utilized with soft or spongy ground, which may have a lot of humus, for example, the furrow and seedbed is formed, only to have it shrink or disappear, with the furrow providing little open area on the ground cover sunlight and passage of the seedlings therethrough.

Therefore, there exists a need for a minimum tillage planter/renovator system which is able to displace the ground cover during planting, while uplifting, displacing, and grinding the displaced soil and ground cover so that it allows the formation of a wider, finer, less dense seedbed with finer tilth, and further which does not shrink back to form a narrow furrow, while minimizing disturbance of the ground cover.

While none of the below cited patents are believed to teach the concepts embodied in the invention, the following patents were deemed at least generally pertinent to the minimum tillage planting or the like:

| Patent Number | Inventor(s) | Date of Issue |
| --- | --- | --- |
| 5413056 | Freed et al | 05/09/1995 |
| 5375542 | Schaffer | 12/27/1994 |
| 5279236 | Truax | 01/18/1994 |
| 5255617 | Williams | 10/26/1993 |
| 4779684 | Schultz | 10/25/1988 |
| 4729435 | Urich | 03/08/1968 |
| 4537261 | Hatzell | 08/27/1985 |
| 4336844 | Heibig et al | 01/29/1982 |
| 4331204 | White | 05/25/1982 |
| 4245706 | Dietrich, Sr. | 01/20/1981 |
| 4127073 | Blair | 11/28/1978 |
| 4057112 | Taylor | 11/08/1977 |
| 3960220 | Laitala | 06/01/1976 |

U.S. Pat. No. 4,779,684 illustrates a scouring plow (31) situated at a generally forty-five degree arrange relative to the shank, although there are obvious differences between this patent and the searched for invention.

U.S. Pat. No. 5,255,617 illustrates a scalloped coulter situated at some oblique angle relative to the planter, which coulter is also adjustable via the support member (56).

U.S. Pat. No. 5,279,236 teaches a seed planter wherein there is provided forward of the drill a plurality of trash discs comprising angled coulters, and is provided for general information.

U.S. Pat. No. 5,375,542 teaches a seed covering system utilizing a side mounted, angled coulter.

U.S. Pat. No. 4,729,435 teaches a subsoil tilling implement wherein there is provided a coulter (30) is provided in front of the "ripper member" (22), the system further including a vertically adjustable wheel (24) adjacent to the ripper for varying the depth of the cut.

U.S. Pat. No. 3,960,220 teaches a subsoil plow which is spring supported, providing a vibratory pivotal oscillation during forward motion.

U.S. Pat. No. 4,057,112 teaches a "Subsoil Plow", wherein there is provided a plurality of plow teeth having situated there before a coulter (27). The plow teeth are supported via shear bolt and are configured to pivot upon engaging an obstacle.

U.S. Pat. No. 4,127,073 teaches a "Subsoil Tillage Tooth" wherein there is provided a shank having a tip having a generally horizontal edge, and a cusp (54) in the medial area of the shank, as well as a winged trailing member (30), providing cutting blades for severing roots, "and to create a broken soil cap and moisture retaining blanket".

U.S. Pat. No. 4,245,706 teaches the utilization of shank like members having a top including wing-like work surfaces situated at the generally frontal, tip portion of the shank.

U.S. Pat. No. 4,331,204 teaches a "Tillage Implement" wherein there is provided, as shown in FIG. 3, a shank member having a generally horizontal leading edge (78), and first and second opposing wing-like cutting members (82).

U.S. Pat. No. 4,336,844 issued 1982, teaches a chisel having a generally horizontal leading edge, the shank having mounted thereupon a lister (41), configured to form an enhanced bed.

U.S. Pat. No. 5,413,056 teaches a no-till planter utilizing angled coulters, although the configuration is noticeably different from the present invention.

U.S. Pat. No. 4,230,054 as relating to a coulter (13) situated adjacent to the shank, for "smoothing" the soil.

U.S. Pat. Nos. 3,707,132, 3,854,429, and Austrian 27361, for mole plow-like members rearwardly disposed of the shank.

U.S. Pat. Nos. 4,638,748 and 4,592,294 relating scouring plow-like members disposed to the rear of the shank.

Lastly, U.S. Pat. No. 3,122,111 contemplating a curved surfaced coulter to provide an off-axis cut relative to the boot. Further included area soil spreaders (83, 81) adjacent to the boot, and a soil packer (89) following the boot.

FIG. 1 illustrates an example of a prior art planter, wherein there is provided a frame 1 having a front 2 and a rear 3, the front of the frame having situated there below a leading slicing coulter 4, the rear of the frame having situated below a ripping point 5 which generally would be in alignment with the coulter 4, and a mole plow 6 following the coulter. The system may be motivated 7 utilizing a tractor, via a three point hitch, which may be associated with the front 2 of the frame.

A general problem with this prior art arrangement is that the leading slicing coulter requires far too much weight to penetrate hard ground, providing an inefficient and sometimes difficult means of establishing a leading slice. Further, in soft or spongy soil conditions, the coulter may not cut trash in its path, instead burying the trash beneath the coulter, and into the path of the ripping point and/or into the seedbed, disturbing the renovation/planting process.

In addition, in root bound and/or wet conditions sod, mostly roots, (since the roots have displaced the normal amount of soil) and/or humus is springy or spongy and, and will move out horizontally and not be cut away and ground up by the grinding action of the ripping point and rear mole plows. The consequence of this is that the sod/roots move back into near condition leaving a too narrow seed bed and furrow to allow sufficient plants and especially sufficient sunlight into the formed furrow for emerging plants' survival. To simply widen the point and mole plows to make the furrow wider causes the sod to project outward and roll over giving ragged, uncontrollable, unacceptable furrows/seed beds and damages sod strip (or any ground cover) in between rows.

Thus, while the above contemplates various configurations of "no-till" planters and the like, none appear to teach or suggest a minimum tillage planter/renovator system which is able to displace the ground cover during planting, providing an open furrow without unduly disturbing the ground cover, while providing an enhanced seed bed.

GENERAL SUMMARY DISCUSSION OF THE INVENTION

Unlike the prior art, the present invention contemplates a minimum tillage planter/renovator system which provides an enhanced seed bed and clean furrow, with nominal ground cover disturbance, in a variety of soil conditions. Thus, the invention provides a minimum tillage planter/renovator which performs in superior fashion over the prior art, while remaining cost-competitive to purchase and relatively inexpensive to operate, with relatively low maintenance.

The system of the present invention contemplates a planter/fertilizer which teaches a different coulter configuration when compared to prior art minimum tillage planters, providing an implement which is easier to utilize and more efficient in soil bed formation.

The present system further contemplates a unique ripping point design, which is configured to penetrate a predetermined depth into the soil or sod, the ripping point designed to facilitate a splitting and lifting of any organic ground cover, which might comprise, for example, sod, widening the ground cover, forming a seedbed void, and lifting the displaced soil and ground cover to a prominent head.

First and second coulters, situated in an angled relationship above and about said ripping point, are configured to independently engage and cut first and second sides of the lifted ground cover, respectively, then cut and grind the lifted ground cover, etc., as the coulters rotate, the coulters cooperatively grinding at least a portion of said lifted ground cover, so as to form tilth, and redeposit said tilth into the seedbed void, providing an enhanced seedbed region with nominal surface disturbance, and a clean furrow.

First and second mole plows are situated in linear alignment with and behind the ripping point, the first mole plow in front and below the second mole plow, with a fertilizer chute situated the first and second mole plows, and a seed chute situated behind the second mole plow, for the selective dispensing of fertilizer and seed into the seedbed void during operation of the present invention. U.S. Pat. No. 6,009,955 issued Jan. 4, 2000 listing applicant as the inventor teaches a further example of the above discussed implement, and is incorporated herein by reference.

Further taught in the present application is additional mechanism to further facilitate processing of the seedbed, while providing a more consistent and enhanced furrow at the surface. In the present embodiment, situated behind the first and second mole plows and fertilizer and seed chutes are opposing first and second coulters having cutting edges, engaging the right side of the furrow, a larger diameter furrow trimming wheel having outwardly emanating therefrom a depth ring or drum for controlling the trimming depth, while urging the soil forming the furrow to further cover the formed seedbed along the right or first side of the furrow, the second wheel being smaller in diameter and situated to trim the furrow and assist further in covering the seed for the left or second side of the furrow, the first and second wheels having different diameters so that they rotate at different speeds in a cooperative fashion to prevent clogging and form tilth, and are situated at opposing angles on horizontal and vertical planes so as to be self cleaning in a variety of soil conditions, while manipulating the soil and organic matter to facilitate enhanced grinding thereof. The wheels are spring biased to allow for adjustable cutting pressure for different soil conditions, vegetation, etc. The second wheel is supported by the first wheel, such that the depth ring or drum of the first wheel also gauges the depth of the second wheel.

Following the first and second wheels is a pressure wheel about the width of the furrow, which is directed over the furrow so as to apply pressure to the furrow, completing the furrow forming process. A plurality of these units are provided in parallel on a common frame, and are affixed to a tractor with a standard three point hitch Speed of operation varies depending upon the size of the unit, the size of the tractor, and the soil conditions, with typical operating speeds ranging from 3–6 miles per hour, for example.

It is therefore an object of the present invention to provide a minimum tillage planter/renovator system which is able to displace the ground cover during planting, and provide a clean, open furrow over the seedbed, while minimizing ground cover disturbance.

It is another object of the present invention to provide a minimum tillage system which is effective in hard pack as well as soft, spongy conditions, providing an enhanced seed bed and furrow, minimizing surface disturbance, while providing intercrop planting, renovating, and/or fertilizing.

It is still another object of the present invention to provide an enhanced seed bed, which is wider than conventional minimum tillage planter seed beds, but without the surface disturbance found with conventional minimum tillage implements.

It is another object of the present invention to provide a minimum tillage planter which includes first and second trimming wheels to trim, flatten, and close the first and second edges of the furrow, respectively the first trimming wheel including a depth ring for supporting the first and second trimming wheels so as to penetrate the ground at a predetermined depth, the first and second trimming wheels having different diameters and situated at opposing angles so as to be self cleaning and prevent clogging.

Lastly, it is an object of the present invention to provide a lighter, more compact minimum tillage planter/renovator, which works equally well in a variety of soil conditions, while providing an enhanced seed bed, a wide, clean furrow, and nominal ground cover disturbance.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein:

FIGS. 7C and 7D are side, partially cut-away view of the first and second furrow trimming wheels of the inventing of FIG. 6, further illustrating the positioning of the mole plows, feeder tube, and seed tube relative to the furrow trimming wheels and furrow forming side plates.

FIG. 8B is a side, isometric view of the first, larger furrow trimming wheel removed from the unit for a view of the trimming wheel support frame.

DETAILED DISCUSSION OF THE INVENTION

Figure 1:
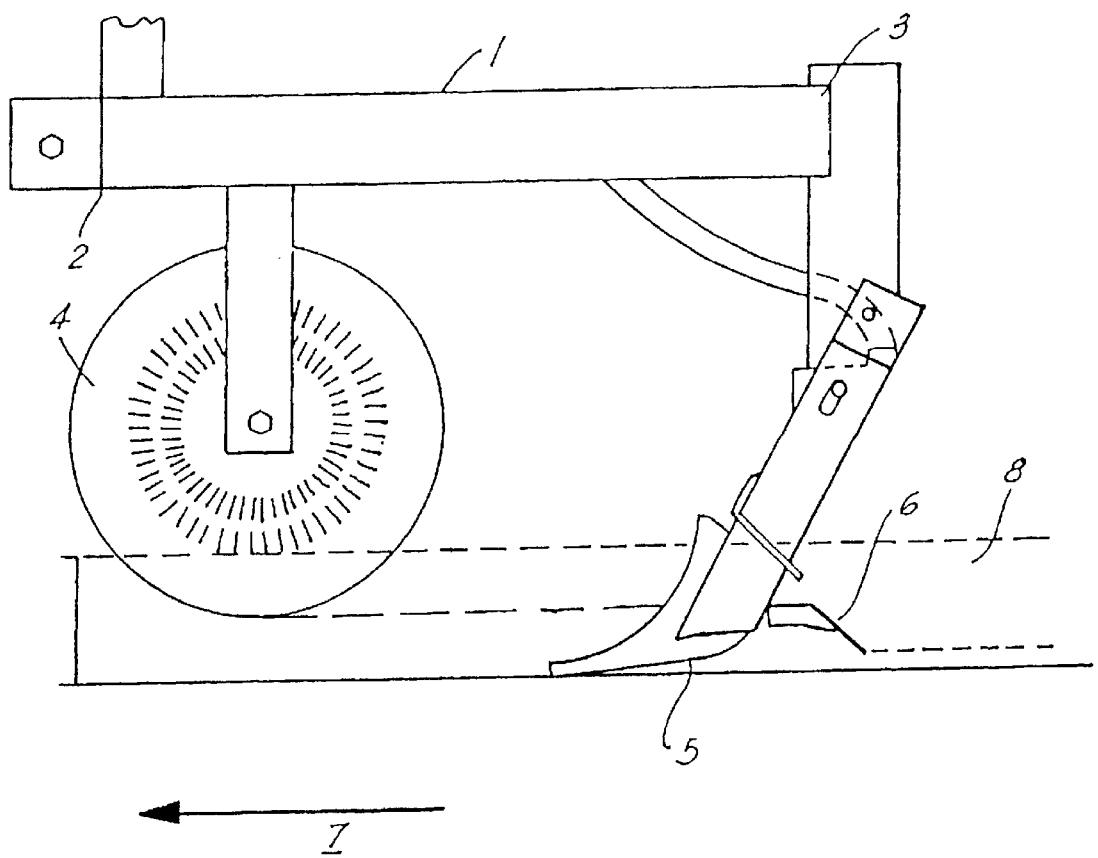
FIG. 1 is a side view of an exemplary prior art minimum tillage planter.
Figure 2:
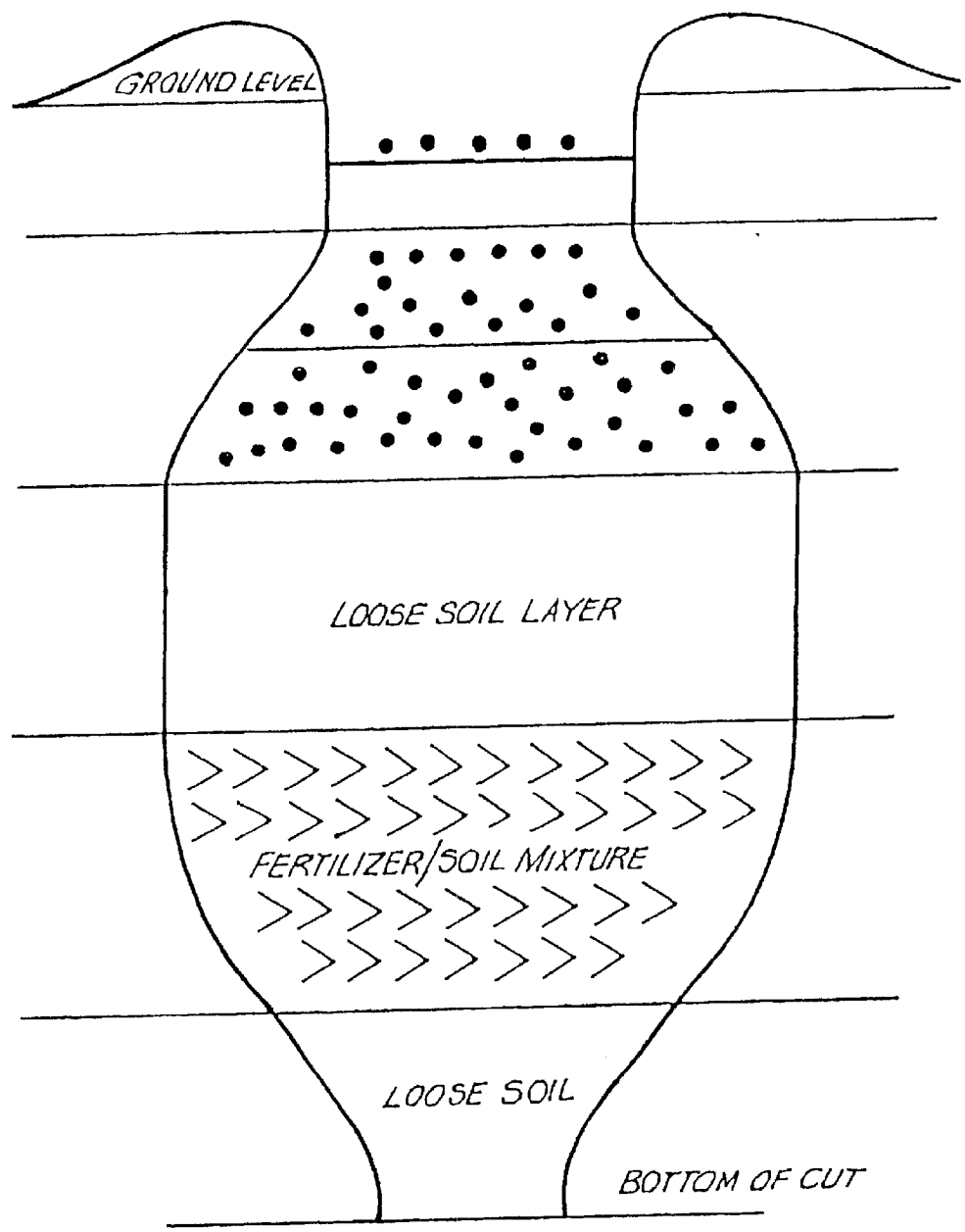
FIG. 2 is a cross-sectional view of an exemplary furrow and seed bed formed by the present invention even in soft, spongy soil, which provides a significantly wider furrow and seed bed, with finer tilth, as compared to a conventional minimum tillage seedbed.
Figure 3A:
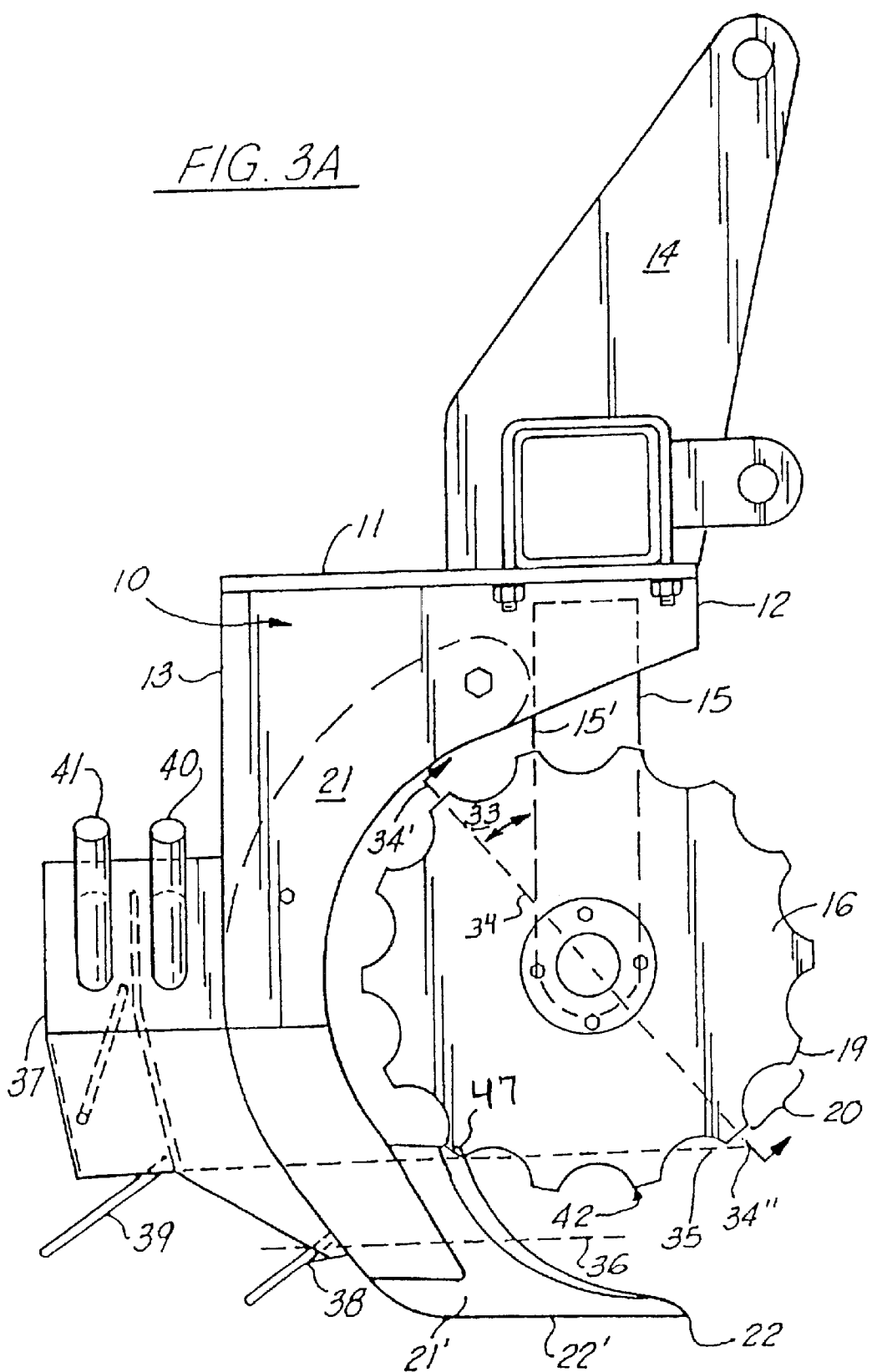
FIG. 3A is a side view of a minimum tillage planter/renovator of the present invention.
Figure 3B:
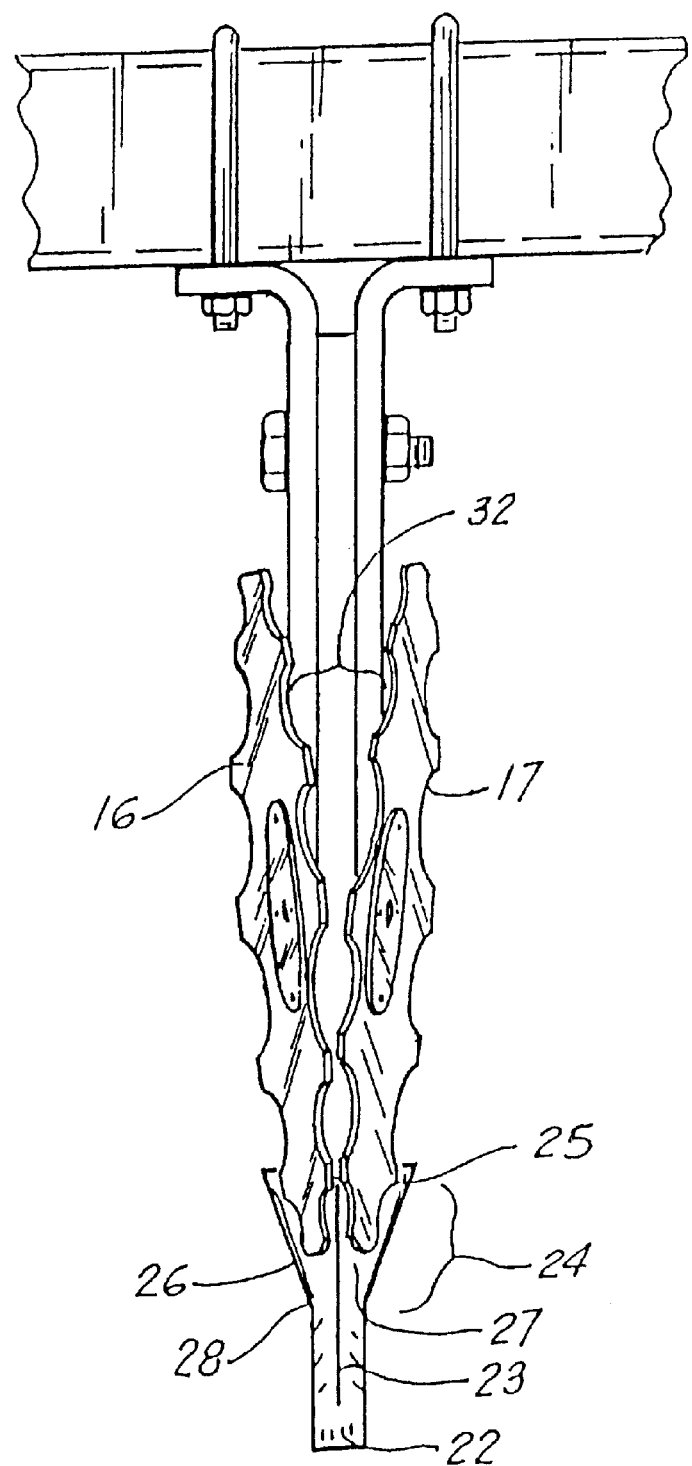
FIG. 3B is a front view of the minimum tillage planter/renovator of FIG. 3A.
Figure 3C:
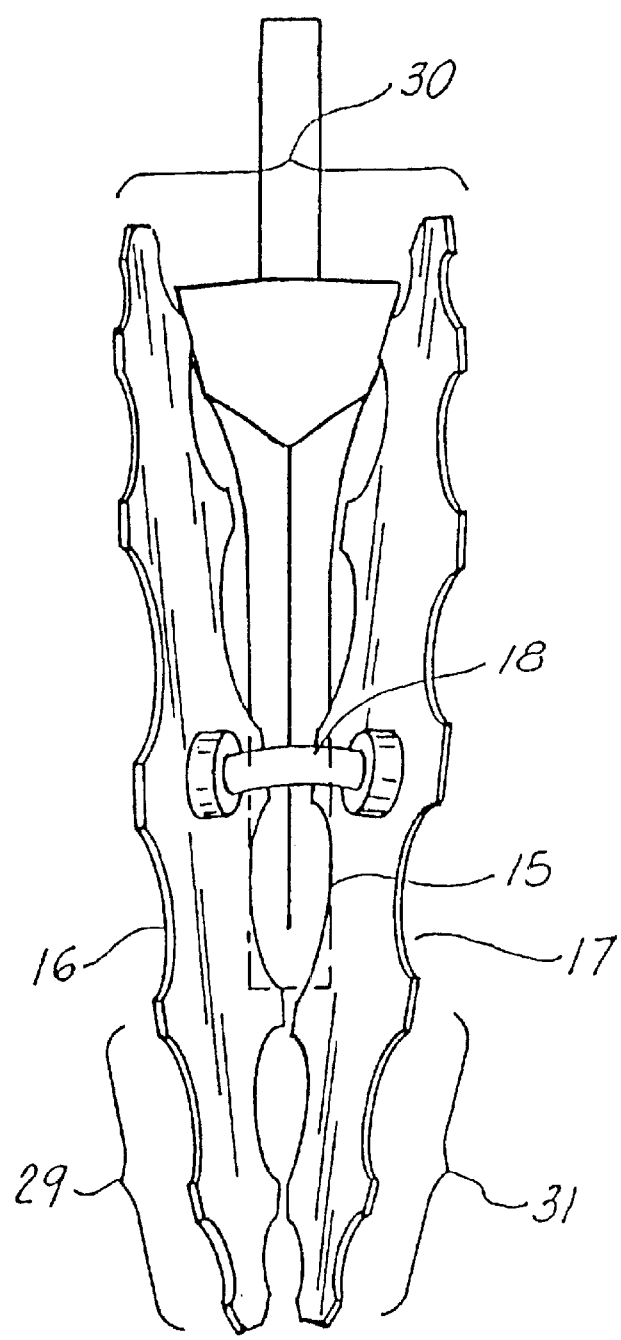
FIG. 3C is a top view of the minimum tillage planter/renovator of FIG. 3A.

Referring to FIGS. 3A–3C of the drawings, the first embodiment of the present invention teaches a minimum tillage planter/renovator which dispenses with the necessity of a leading slicing coulter (4 in FIG. 1), providing an enhanced seedbed with a lighter implement.

As shown, the minimum tillage planter/renovator 10 comprises a frame 11 having a first, frontal end 12 and a second, rear end 13. Shown atop the frame is a standard, three point hitch 14, which may be utilized by a tractor or other implement to motivate the present system.

Continuing with the drawings, emanating from the frame 11 near the first end 12 in general vertical fashion is a front vertical support member 15, configured to support first 16 and second 17 coulter discs about said vertical support member, via axle 18 in angled relationship, as will be further discussed infra. As shown, the outer diameter 19 of the coulter discs 16, 17 may be rippled 20, scalloped, or otherwise shaped to form a cutting edge which supports a grinding action, although the rippled configuration has been found to be the most efficient configuration for general soil conditions.

Situated behind and aligned with the front vertical support member 15 is rear vertical support member 21, supporting a foot shank 21' which curves about ninety degrees along an arc along a frontal face 24 which has an upper end situated generally above ground line 35, the frontal face, forming a spreading area which tapers from a wide upper portion 25 to a medial portion 28, to a ripping point 22 which has a point somewhat perpendicular in relation to the frontal support member.

The curved arc forming the frontal face 24 of the foot shank (which arc may vary, and may even be linear, depending upon the operating criteria) forms a lifting edge 23 for lifting soil during the operation of the system, which will be further described infra.

The complete configuration and operation of the front first and second coulter discs and foot shank is described in detail in an earlier patent issued to the present applicant entitled "Enhanced Minimum Tillage Planter/Renovator System", having patent application Ser. No. 09/169,496, filed Oct. 19, 1998, issuing as U.S. Pat. No. 6,009,955 on Jan. 4, 2000, the entire disclosure of which is incorporated herein by reference..

The present embodiment of the foot shank has a frontal face 24 which is divided into first 26 and second 27 faces to enhance cutting and dividing of the soil to form the furrow and seedbed.

Continuing with FIGS. 3A–3C, the first 16 and second 17 discs are supported via axle 18 at an angle 33 along a line 34 which is situated about forty-five degrees relative to the rear edge 15' of the front vertical support member 15 (or the horizontal, as exemplified in the ground line 35), wherein the first and second discs are angled relative to one another 32 at about between 4 and 25 degrees, in the practice embodiment, generally about 6 or 7 degrees, bringing the first and second discs outer diameter 19 (which outer diameter is in the exemplary embodiment 11.5") close together 29 (which could comprise a spacing of about, for example, ⅛" to ½") at the first end 34' of line 34, and at their widest spaced point 30 at the second end 34' of line 34, an exemplary spacing of about, for example, 4 to 5 inches; further, at 7 degrees, the outer diameter of the exemplary embodiment of the discs at the tip of the foot shank 47 is spaced at just, for example, ⅜", with the discs spaced at about 3" apart above the tip of the foot shank 47.

The first end 34" of line 34 corresponds generally with, slightly above, or slightly below the anticipated ground line 35 of the system when in use, so that the discs may communicate with the ground cover initially at their closest point relative to one another, together forming a splitting and cutting, leading edge 31 with the lowest portion 42 of the discs under the ground line 35 found generally below the front vertical support member 15.

Situated generally below the second end 13 of the frame 11 is a planter component 37 which may include, for example, first and second seed/fertilizer conduits 40, 41, configured to place seed/fertilizer in a furrow formed by the system, in the vicinity of, for example, first 38 and second 39 mole plows, respectively. The mole plows may be staggered to provided seed/fertilizer at varying levels in the furrow; for example, the first 38 mole plow may emanate from the planter component along a line 36 corresponding with the approximate midpoint of foot shank 21', while the second 39 mole plow may emanate from the planter component at about the ground line 35, with the mole plows themselves comprising plow members situated at generally about a forty five degree angle relative to the horizontal, and configured as is generally practiced in the art.

The mole plows carve out the sidewalls, the first mole plow turning the material down, and allow the fertilizer to be brought to the bottom of the furrow. The second mole plow causes the soil to flow from horizontal down, turns to the bottom of the furrow, where the point has lifted and removed, turning it back.

In the present, first exemplary embodiment of the invention, the two coulters may be, for example 13" in diameter with the earlier embodiment scalloped cutting edges, with the preferred embodiment having a 11.5" diameter with rippled cutting edges, and other diameter coulters may be employed in different scale systems and/or different operating conditions, with similar positive results. The diameter provides a needed radius proportioned to the size and the arc of the point for the scale of the exemplary embodiment, and may vary depending upon soil conditions and performance criteria. The center or axle of the coulters is preferably placed vertically (directly) over a point 1⅞" back from the leading edge of the exemplary ripping point of the exemplary embodiment of the present invention, which comprises is publicly available from Tarver Sales Corp of Folsom, LA as part number TD 99, which is incorporated herein by reference.

In use, referring to FIG. 4, the ripping point penetrates the ground such that the front vertical support member 15 is situated in a generally vertical position, and the ripping point 22 forms a generally horizontal leading edge about, for example, 4–6½", or, for example, about 5½" approximately below ground line 35. The ripping point breaks apart the sod and ground as it is spread by the lifting edge 23 and tapered spreading area 24 of the foot shank 21'. In addition, the breaking apart and lifting action precedes (out front) the ripping point 22 by a distance, under some soil conditions, of several inches, starting its lifting, heaving, and parting action of the soil, providing an upward thrust 43.

The upward thrust 43 caused by the ripping point, lifting edge, and spreading area of foot shank 21' raises the sod/soil and all the trash laying on top of the surface up into the leading edge 31 formed by first 16 and second 17 disc coulters, causing it to be sliced.

The slicing action caused by this configuration eliminates the need for the leading slicing coulter (4 in FIG. 1) known in the past and the carrying of all the weight necessary for penetration. The slicing action of the trash, roots and hard soil (material) obtained here between the ripping point and dual coulters is positive even in wet, sandy, soft, sod conditions. The old leading coulter would bury trash down into the soil under those conditions without cutting it. This caused blockage of the ripping point and necessitated cleaning by hand.

The dual slicing coulters of the present invention, on the other hand, provide a leading edge slicing, spreading, and grinding action via the rotation of the cutting edges of the coulter discs, at first cutting the ground cover at the leading edge, then spreading and grinding the split ground cover, with the movement 44 of the system, as the foot shank and ripping point lifts the soil and ground cover, while forming the furrow. The rippled edges in the preferred embodiment rotate as they traverse the ground, entering it and taking different sized bites out of the sidewalls, due to the angle of the blades in their forward travel.

The ripping point of the present embodiment of the present invention penetrates about 5½" into the ground, lifts the soil and ground cover to be engaged by the disc coulters, further lifts and splits the soil, forming a furrow, and the ripping point arcs up and widens out rather harshly creating a blunt, prominent head.

In the present embodiment of the invention, the angle of the "V" shape forming the upper lifting end of the foot shank is continued out only approximately 65% of its widening travel before the degree of the angle is abruptly reduced as the head continues to widen to its total width.

Further, the exemplary embodiment of the coulters are each angled out from a vertical line through their axle 18 (FIG. 3C) at about, for example, seven degrees (with the 11.5" exemplary coulter) creating a spacing between themselves of approximately 1½" at the lowest point 42, and approximately 3" apart at the top.

Figure 4:
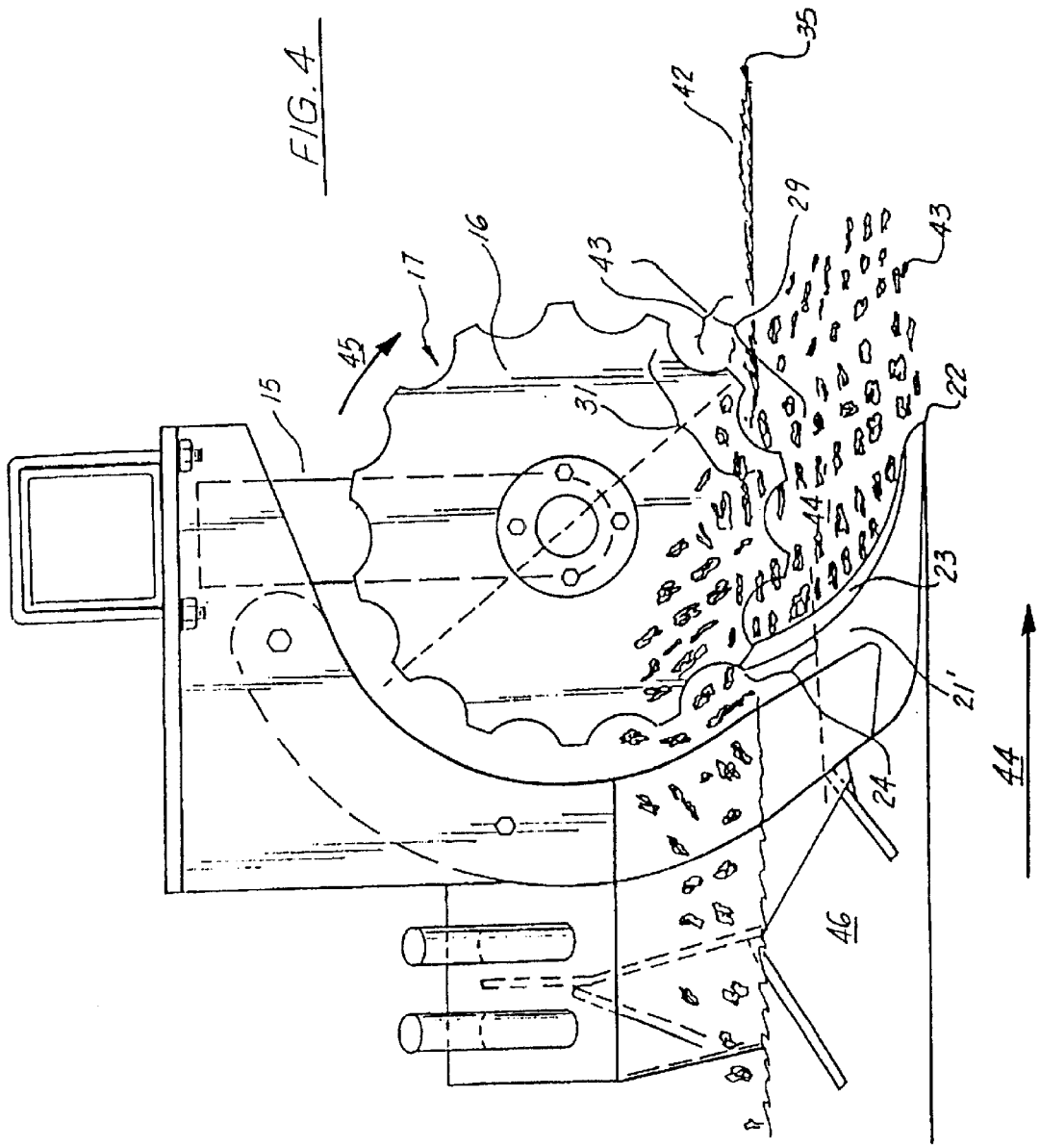
FIG. 4 is a side, partially cut-way view of the minimum tillage planter/renovator of FIG. 3A, illustrating the forming of the furrow/seedbed, and associated cutting/chopping of ground cover in the vicinity of the furrow.

Continuing with FIG. 4, the sod and trash is forced up and cut in short lengths by the rotating rippled or scalloped edges of the disc coulters. (The sod is heaving up from ground surface level by the forward eruption created ahead of ripping point), cut again in short lengths at the lowest point of the coulters, and again where the coulters edges are closest to the foot shank at 47. This multiple cutting is caused by the increasing distance between the coulter blades as they travel to the rear and receive the broken and heaving soil from directly beneath them. As the ground cover passes by the ripping point head, a shearing action occurs.

Additionally, the upper lifting end of the foot shank is stopping the flow of fine cut up materials, causing the material positioned between the coulters to roll, thereby causing more cutting, as the scallops in the coulters and a holding area cavity is formed in an area between the coulters placed in their dual angled directions, and the wide head at the top of the foot shank 21'.

The coulter scalloped cutting edges recut and grind organic ground cover, trash and soil as it rolls around in the area above the foot shank, between the coulters, thereby providing grinding means for chopping and grinding ground cover engaging the leading edge of said coulter arrangement, the ground material filtering out through the scallops, and is returned to the furrow as a fine tilth from all of the repeated cutting actions, providing a redeposit means for filling the furrow with tilth, the non-ground trash being displaced from the furrow area by the rippled coulters, all creating:

1. A perfect seedbed
2. A positive cut of even spongy, wet soft sod or humus that leaves the desired spacing (generally about 1½") approximate opening in the furrow at the surface that will not close back up, because the material was forced into a controlled cutting/slicing action and not allowed to spring out beyond the cutting and grinding action of the ripping point and mole plows.

Thereby providing a low tillage planting system wherein there is:

1. Less weight required.
2. A positive forced cutting of trash and more mulching grinding of trash and soil into a better seedbed tilth.
3. The furrow opening width cannot close back up preventing sunlight entrance, etc.
4. It is possible for a much more compact designed planter.

PREFERRED EMBODIMENT OF THE INVENTION

Figure 5A:
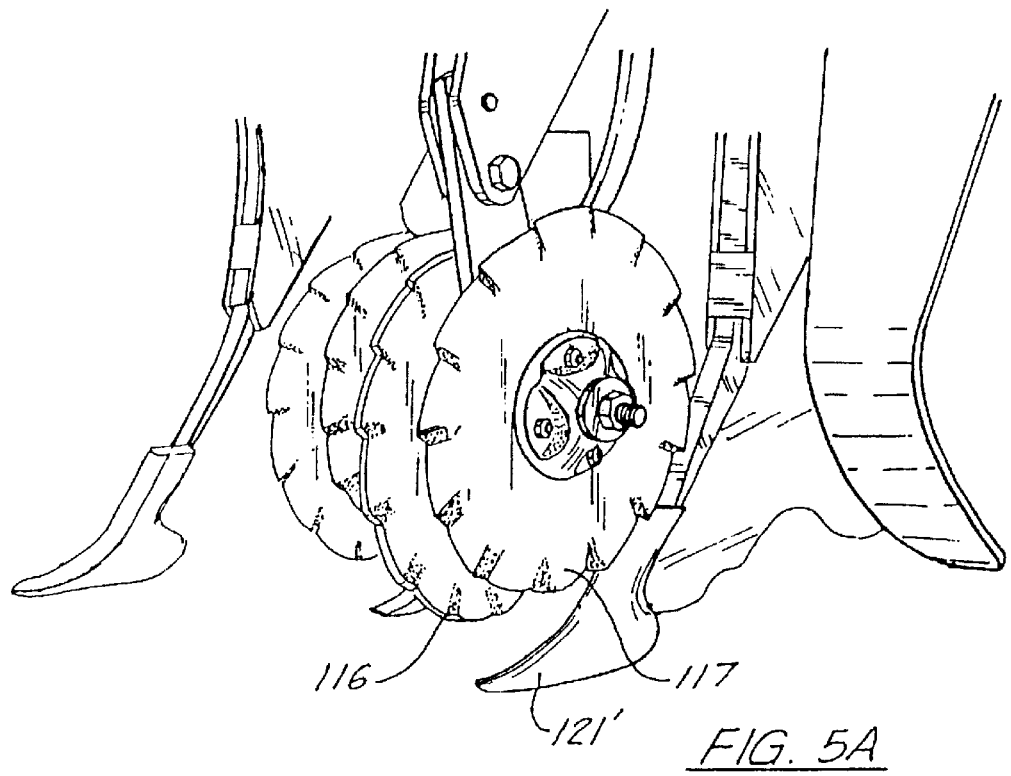
FIG. 5A is a side, isometric view of the preferred embodiment of the minimum tillage planter/renovator of the system of the present invention.
Figure 5B:
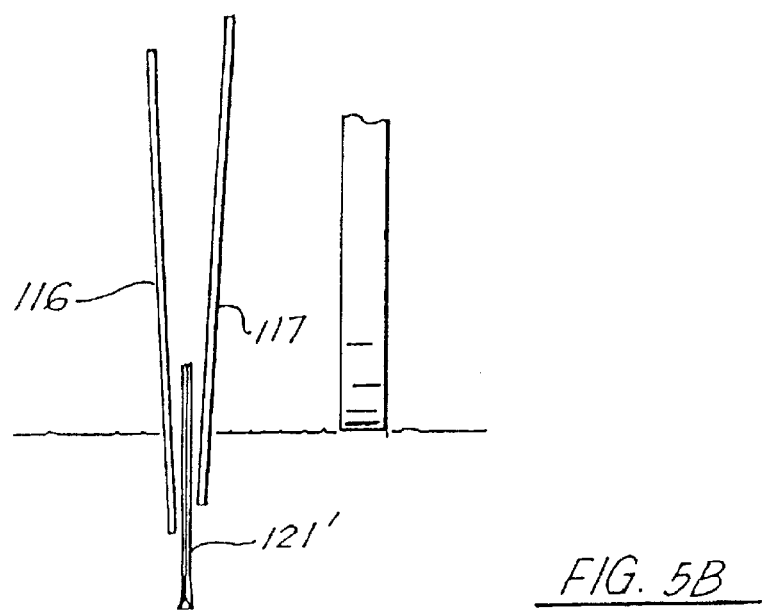
FIG. 5B is an illustrative drawing indicating the general positions of the first and second coulters relative to the foot shank and ground level of the invention of FIG. 5A.
Figure 5C:
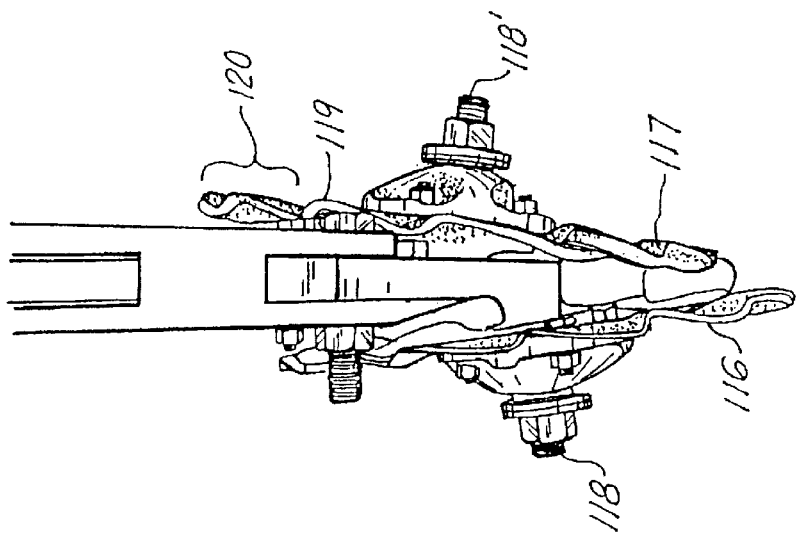
FIG. 5C is an upper, frontal view of the first and second rippled coulters as pivotally retained by a support member and frame.
Figure 5D:
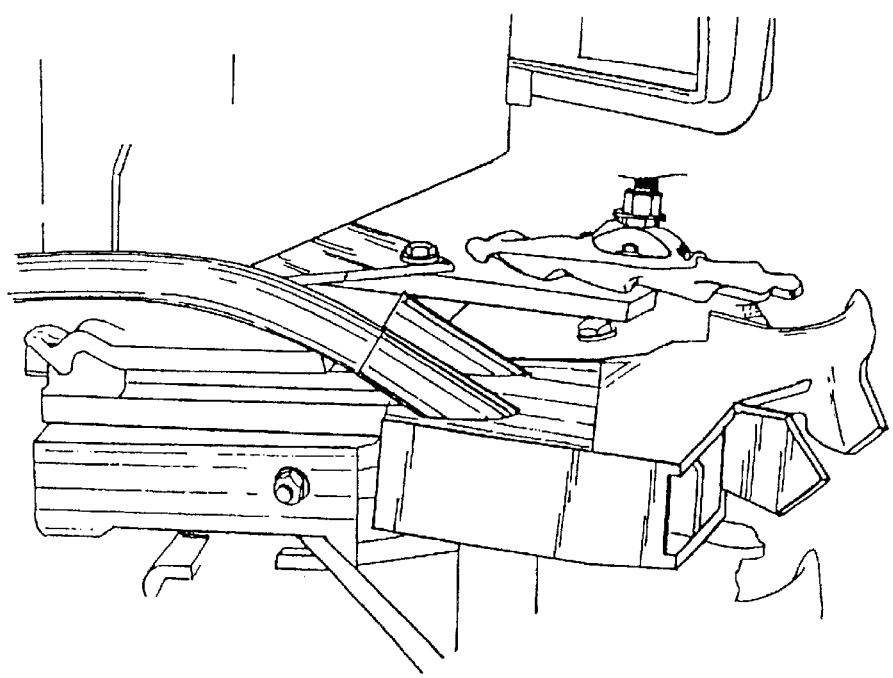
FIG. 5D is a rear, isometric view of the planter/renovator of FIG. 5A, indicating the position of the first coulter and support member relative to the foot shank, frame, and rear planter arrangement.
Figure 5F:
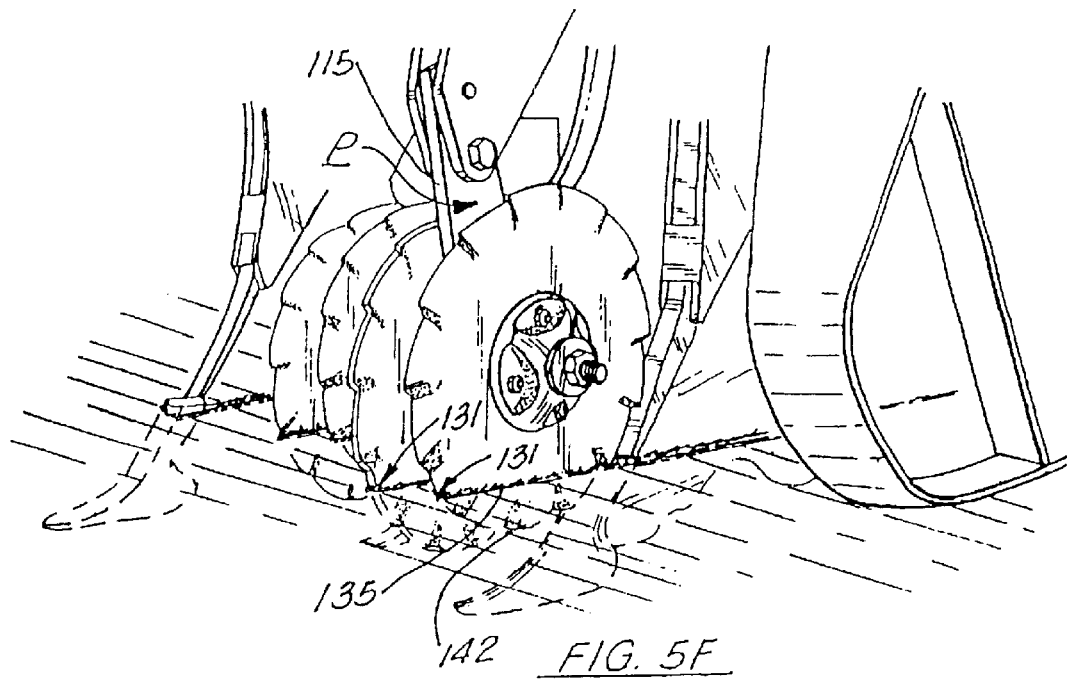
FIG. 5F is a side, isometric view of the invention of 5A, illustrating an implement having multiple sets of foot shanks and corresponding coulters in operation.
Figure 5E:
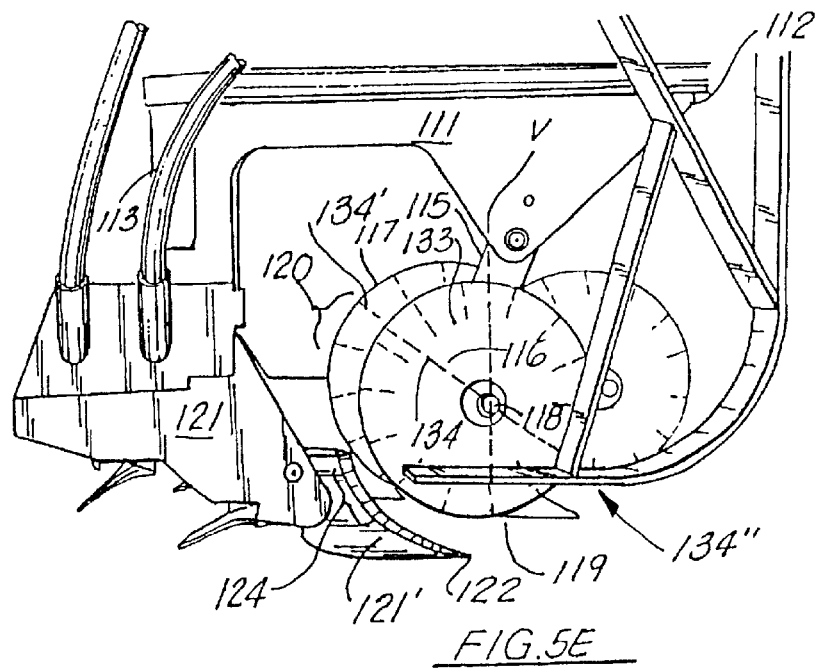
FIG. 5E is a side view of the planter/renovator of FIG. 5A, indicating the position of the first and second coulters relative to the foot shank, frame, and rear planter arrangement.

The preferred embodiment of the invention is disclosed in FIGS. 5A–5F, particularly FIG. 5E, comprising a frame 111 having a first, frontal end 112 and a second, rear end 113. The unit may be motivated via a standard, three point hitch, which may be utilized by a tractor or other implement to motivate the present system, as shown in the discussion of the first embodiment of the invention.

Continuing with the drawings, emanating from the frame 111 in the vicinity of the first end 112 in angled fashion pivotal support member 115, configured to support first 116 and second 117 coulter discs about said support member, via respective axles 118 in angled relationship, as will be further discussed infra. As shown, the outer diameter 119 of the coulter discs 116, 117 may be ripple 120, as better illustrated in FIG. 5C. This rippled outer diameter has been found to provide enhanced grinding and processing action of the organic matter and soil displaced by the foot shank, when compared to the scalloped coulters illustrated in the first embodiment of the invention, supra.

Continuing with FIG. 5E, situated generally behind and generally aligned with the support member 115 is rear support member 121, supporting a foot shank 121' which curves about ninety degrees from a ripping point 122 to along an arc along a frontal face 124 which has an upper end situated generally above the ground line when in use, the foot shank having a configuration and operation corresponding with the disclosure in the first embodiment of the invention, supra.

Continuing with FIGS. 5A, 5B, 5C and 5E, the first 116 and second 117 coulters are supported via first and second axles 118, 118', respectively, such that the first coulter 116 is situated slightly forward of and generally below the second coulter 117, and each coulter is situated at an angle of about 4 degrees relative to the horizontal, although the working angle of such an arrangement can vary between an operative range of about 0–8+ degrees (depending upon soil conditions, operative criteria, etc.), said first and second coulters further each angled relative to the vertical at an angle of about seven degrees relative to the vertical, although the operative range of angles for such coulters, it is anticipated, can run between 0 to 25+ degrees, again depending upon the conditions; in the practice embodiment, 6 or 7 degrees is generally optimal, the discs may be angled 133 relative to the vertical V and line 134 so as to bring the first and second discs outer diameter 119 (which outer diameter is in the exemplary embodiment, for example, about 11½") close together (which could comprise a spacing of about, for example, ⅛" to 1"+, depending upon the size, soil conditions, etc.) at the first end 134" of line 134, and at their widest spaced point at the second end 134' of line 134, an exemplary spacing of about, for example, 4 to 5 inches.

The first end 134" of line 134 may correspond generally with, slightly above, or slightly below the anticipated ground line of the system when in use, so that the discs may communicate with the ground cover initially at their closest point relative to one another, together forming a splitting and cutting, leading edge 131 (FIG. 5F) with the lowest portion 142 of the discs under the ground line 135 found generally below the front support member 115.

In the present, first exemplary embodiment of the invention, the two coulters are 11½" in diameter with rippled cutting edges, as earlier indicated, although other diameter coulters may be employed in different scale systems and/or different operating conditions, with similar positive results. The 11½" diameter has a needed radius proportioned to the size and the arc of the point for the scale of the exemplary embodiment, and may vary depending upon soil conditions and performance criteria. The rippled coulters are publicly available and may comprise, for example, part number TK 6 available from Tarver Sales Corp of Folsom, La., which is incorporated herein by reference.

Continuing with FIG. 5E, the front support 115 is pivotally attached to the frame to allow it to manually pivot P forward to allow for the user to remove rocks or the like if they may become lodged between a coulter and the ripping point. The forward motion of the frame drives the front support back to the operative position, and urges same to remain in operative position during operations.

In use, the present, preferred embodiment operates as the first embodiment supra, except that the staggered spacing of the first and second coulters above, the rippled outer diameter of the coulters (versus the old scallop design), and the pivot of the coulters, which is distinguishable from the first embodiment, all facilitate a more efficient, more consistent operation over the first embodiment and all known previous designs, and prior art systems.

Preferred, Second Embodiment of the Present Invention

Figure 6:
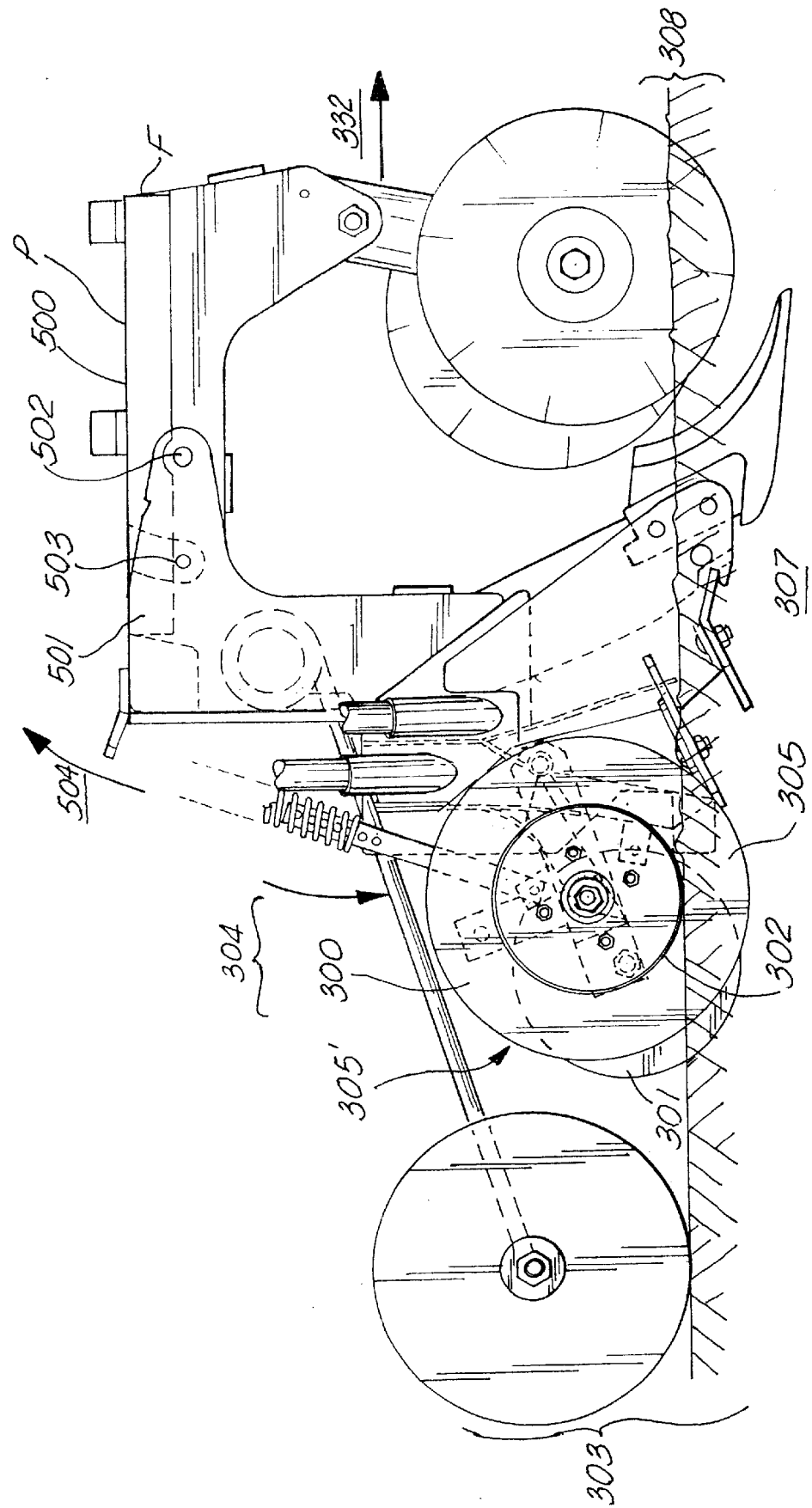
FIG. 6 is a side view of the preferred embodiment of the invention of FIG. 5A, having further incorporated therein a first, larger, and second, smaller furrow trimming wheel, followed by a firming wheel.

Utilizing a planter/renovator P having a frame, first and second coulters, and a foot shank/ripping point identical to the planter/renovator of FIGS. 5A–5F, unless otherwise indicated (the discussion of said planter/renovator is hereby incorporated by reference), continuing with FIG. 6, a second preferred embodiment of the present invention includes the planter/renovator of FIGS. 5A–5F, including the rippled coulters, frame, foot shank/ripping point, and fertilizer/seed dispensing system associated with first and second mole plows configured and as discussed supra, with the additional feature of furrow trimming means for trimming the edges of the furrow formed by the minimum tillage planter/renovator P, further enhancing the appearance and uniformity of the furrow. As shown, the frame F comprises a front section 500 and a rear section 501 which is pivotally connected 502, and which is held in a generally aligned fashion via shear bolt 503. The shear bolt is designed to shear in the event that a rock or other obstruction blocks passage of the foot shank/ripping point through the soil at a force greater than the shear force of the shear bolt, at which point the shear bolt would shear, and the rear section 501 of the frame would pivot at pivot point 503 upward and over the obstruction.

Referring to FIGS. 6, 7A–7C and 8A–8B, the first 331 and second 331' edges of the furrow 330 formed by the first and second front coulters cooperatively engaging the ground cover with the foot shank, as discussed supra, are further trimmed 312 and finished with first 300 and second 301 furrow trimming wheels, respectively, situated in linear alignment with and to the rear of the first and second coulters, foot shank with ripping point, and first and second mole plows. In addition to trimming and finishing the furrow, providing a finished appearance, the furrow trimming wheels also condition the seed bed so as to close any gaps in the soil formed by the mole plows during planting and fertilizing of the seed bed, insuring full enclosure of the seeds by the tilth.

As shown, the first 300 and second 301 furrow trimming discs are supported engage via shafts 329, 329', respectively, a common frame 309 having first 325, and second 325' ends, and a medial area 326 area therebetween, the frame having first 327 and second 327', parallel support members pivotally engaging opposing sides of the main frame F at the first end 325 of the frame 309, with the first furrow trimming disc 300 affixed to the frame in the vicinity of the medial area 326, the second furrow trimming disc 301 affixed to the frame in the vicinity of the second end 325' of the frame 309. The first 327 and second 327' parallel support members forming the frame are spaced and connected at the second 325' end of the frame via lateral support member 328, which spaces the first and second furrow cutting blades so that they engage opposing edges of the furrow.

Continuing with the drawings, the first 300 furrow trimming disc has a larger diameter 303 (for example, about 11½ inches), the second furrow trimming disc 301 having a smaller diameter 304 (for example, about 8 inches, or about 30% smaller) so that the two wheels, when rotating and slicing opposing edges of the furrow, rotate 311 at different speeds, so as to cooperatively prevent clogging of debris and soil between the furrow trimming wheels, so as to provide a self cleaning function, and form more tilth. The first and second furrow trimming discs of the illustrated exemplary embodiment are flat and have a uniform sharp edge on the outer diameter, but other configurations may be implemented depending upon the soil conditions, moisture content, and other factors.

Each furrow trimming wheel has opposing inner 305', and outer 305 sides, each furrow trimming disc rotatingly engaging a shaft emanating laterally from opposing sides of the support frame 309, from the inner sides of each respective disc 300, 301. The outer 305 side of the first, larger furrow trimming disc 300 has emanating therefrom a centered, depth drum 302 having a width 302' extending laterally from the outer side of the disc, the width of the depth drum 302 configured to engage the top of the soil 307, so as to support the first 300 and second 301 furrow trimming discs (the first wheel supporting the second wheel via frame 309) at the desired cutting depth of, for example, about 2½ inches, which roughly correspond to about the depth 308 of the first and second coulters at the front of the implement, although the depth may vary according to adjustments, environment, and design variations. Generally, the second furrow trimming disc 301 has a depth of cut 323 which corresponds to the depth of cut 333 of the first furrow trimming disc 300.

Each furrow trimming disc 300, 301 has sharpened edges 306, 306', respectively, so as to slice into the soil 307 along opposing sides of the furrow to a predetermined depth (as controlled by the depth drum 302), each disc rotating at different speeds due to the size differential of each wheel, as discussed above, as the implement is being pulled forward 332. The furrow trimming discs 300, 301 are situated behind said foot shank and first and second coulters, trimming the rough edges of the furrow as it is drawn along. Adjustable downward bias to the furrow trimming discs via the second end 325' of frame 309 is provided by bias bar 310 having first 310' and second 310" ends, the first end engaging the furrow disc frame 309, the second end engaging the main frame F, with adjustable spring tension provided by spring 313 adjustably situated about bias bar in the vicinity of its second end.

The second trimming disc 301, having a smaller diameter than the first trimming disc 300, rotates faster so as to prevent adherence of soil or the like between the two discs, also causing a churning and grinding action due to the speed differentiation.

Continuing with the figures, a pressure or firming wheel 315 having a width 316 corresponding to the width 316' of the furrow 330. The firming wheel 315 is supported via support member 317 which may be downwardly biased 318' by spring 318. The support member has first 334 and second 334' ends, the first end 334 engaging the main frame F for support, the second end engaging the wheel 315 to support same behind the furrow trimming discs over the width 316' of the furrow 330, so as to apply pressure thereto for firming and flattening same as the firming wheel rotates 320 as the implement is pulled. A scraper 319 may be provided to scrape soil or debris which adheres to the outer diameter surface 321 as it firms the width of the furrow.

Figure 9A:
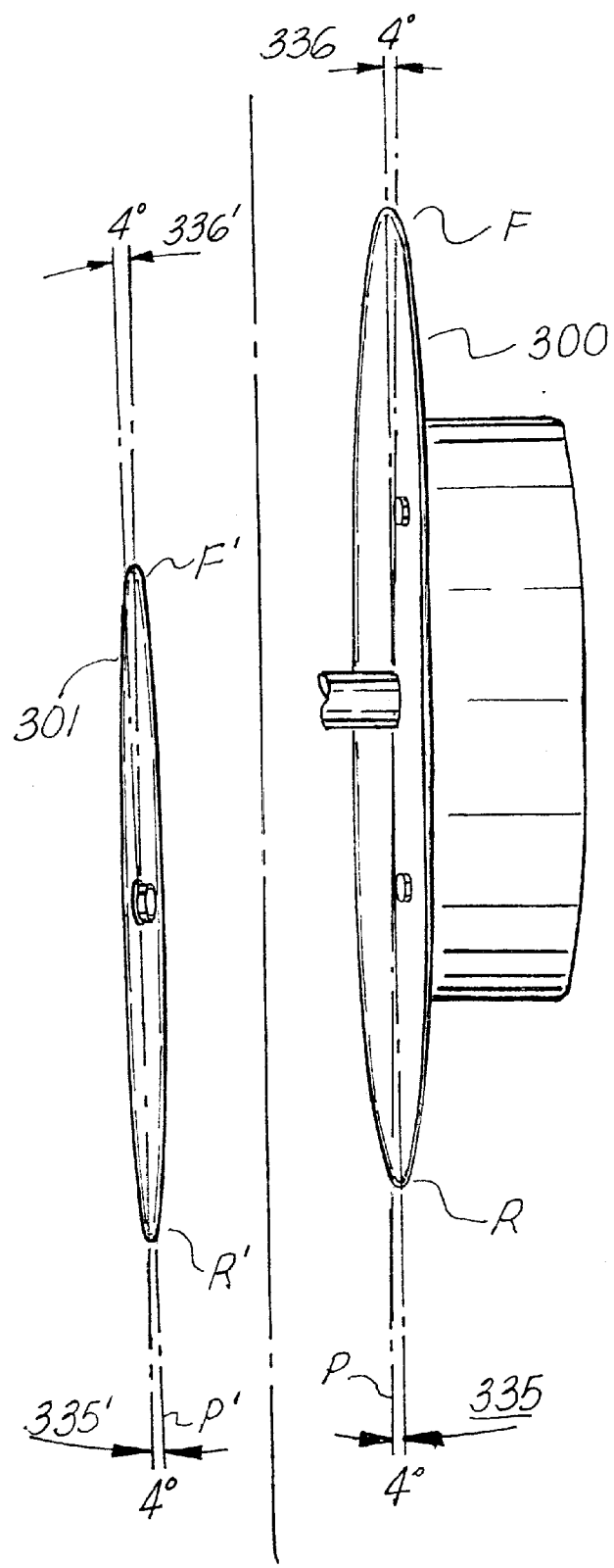
FIG. 9A is a top view illustrating the relative angles and positioning of the first and second furrow trimming wheels.

The first 300 and second 301 furrow trimming discs have opposing angular displacements relative to first and second planes, that is, the first 300 and second 301 furrow trimming discs are each situated at an angle such that, from the top view, referring to FIG. 9A, the rear R, R' of the first and second furrow trimming discs, respectively, are bowed toward 335, 335' the frame at about 4 degrees inward from parallel P, P', and the front F, F' of each wheel correspondingly bowed about 4 degrees outward from the parallel.

Figure 9B:
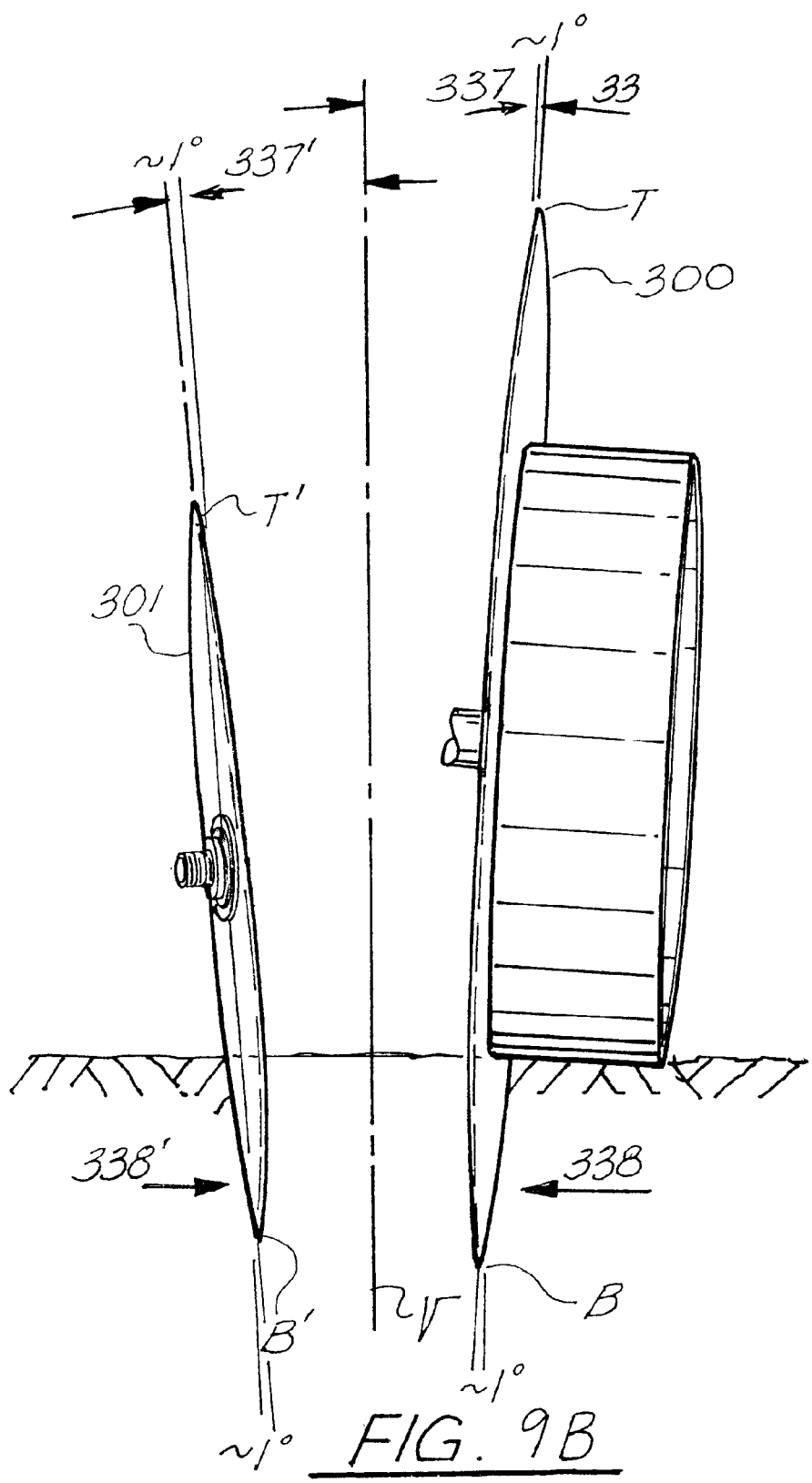
FIG. 9B is a rear view of the relative angles and positioning of the first and second furrow trimming wheels.

Further, referring to FIG. 9B, the top T, T' of each furrow trimming disc 300, 301, respectively, is bowed about 1 degree outward 337, 337' (away from the frame) from vertical V, and the bottom B, B' of each disc is bowed about 1 degree inward 338, 338' (towards the frame), respectively.

These angles, which can range plus or minus 4 degrees, assist in the self cleaning action of the first and second trimming discs as described above, while resisting clogging of the unit in adverse conditions. The angles also facilitate recovering of the seed with soil that has been dropped in by the seed tube, causing soil movement within the seed bed which would close any openings formed by the mole plows.

Figure 7A:
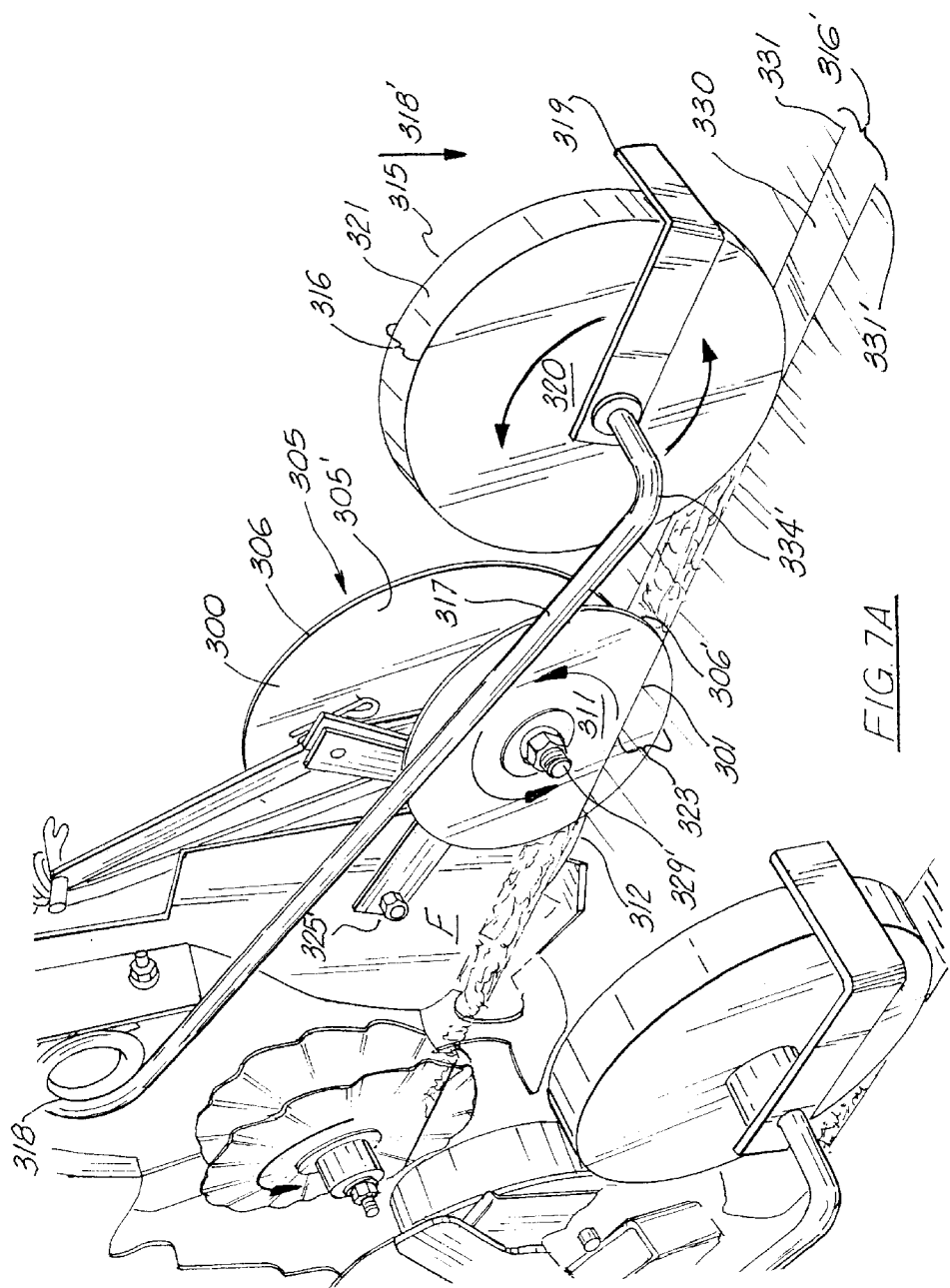
FIG. 7A is a rear, isometric view of the invention of FIG. 6, illustrating the slicing action of the furrow trimming wheels, as well as the position of the firming wheel behind the furrow trimming wheels.
Figure 7B:
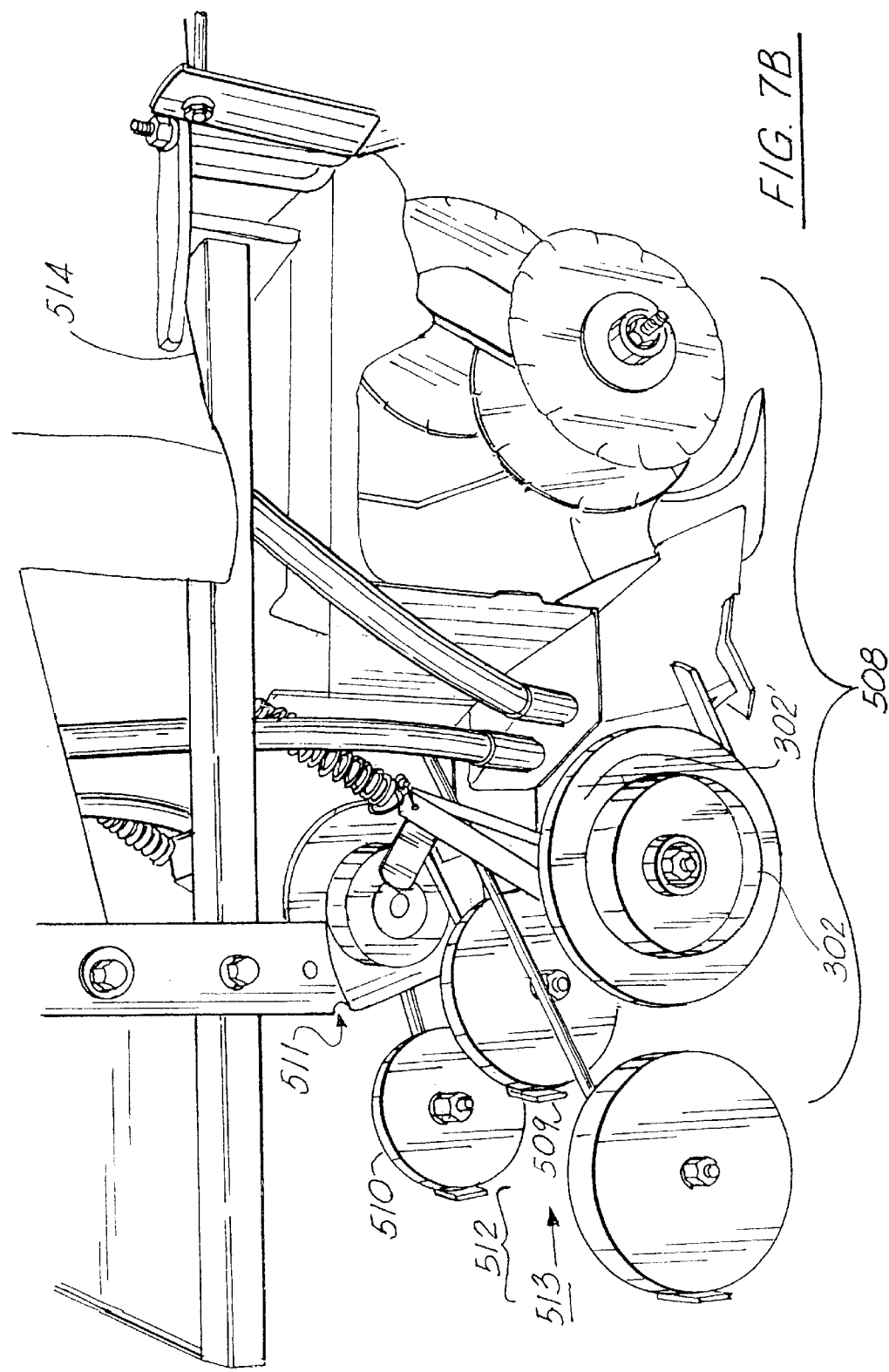
FIG. 7B is a side, isometric view of the invention of FIG. 6, illustrating the larger diameter furrow trimming wheel with its depth drum, and an overall view of the invention of FIG. 6.
Figure 7C:
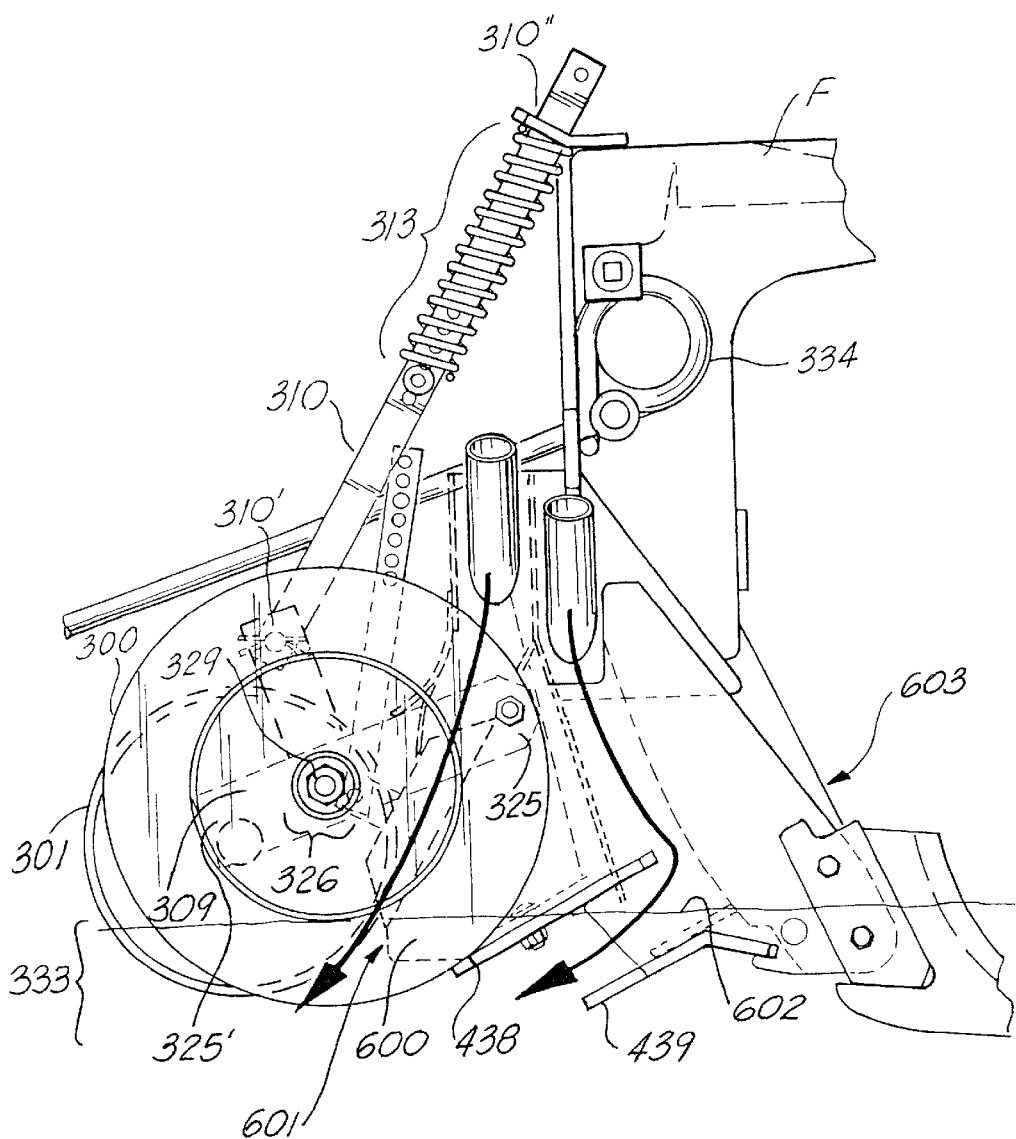
Figure 8A:
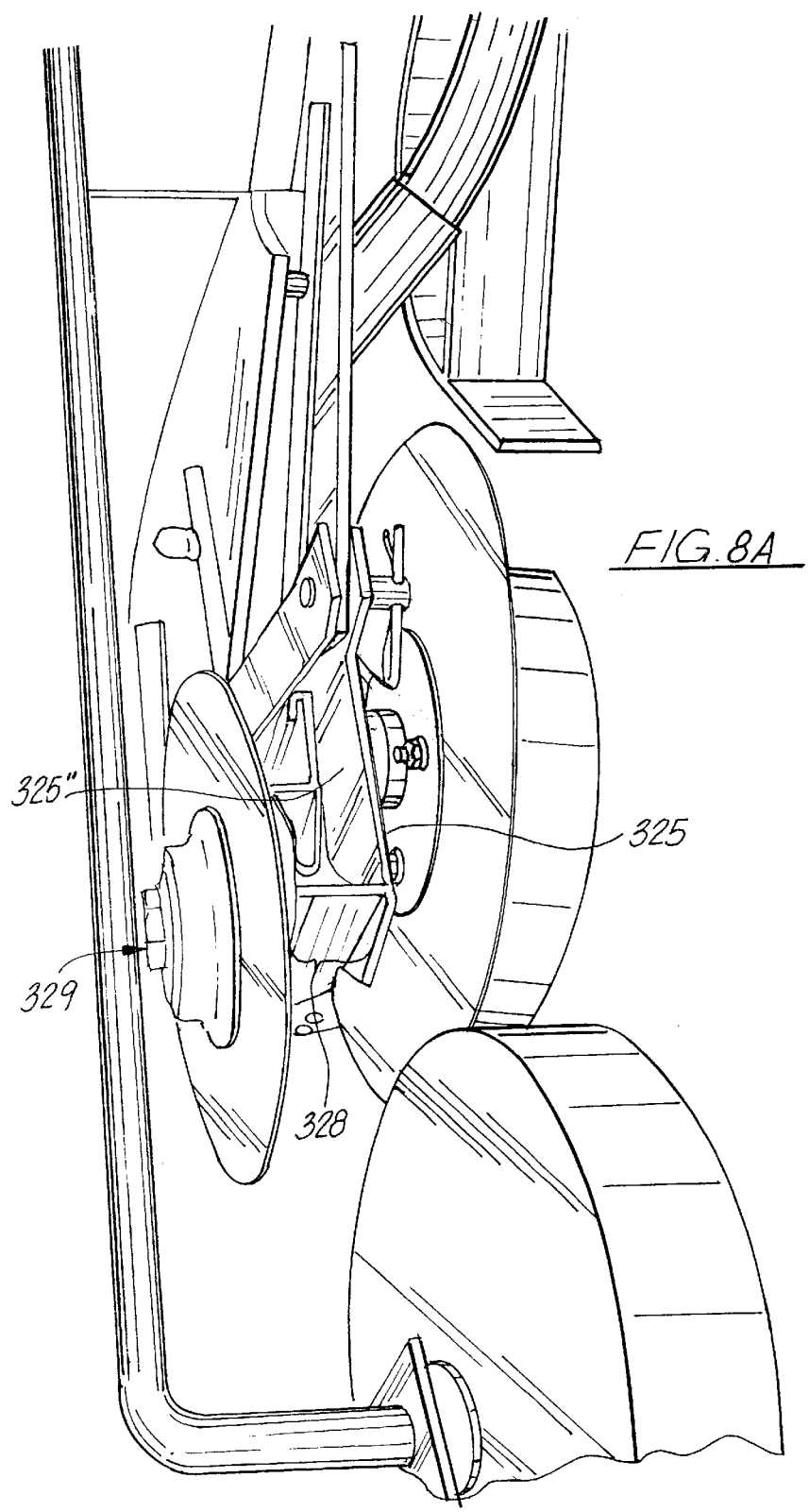
FIG. 8A is a rear, isometric view of the first and second furrow trimming wheels and the firming wheel, illustrating the general configuration of same.

Continuing with FIGS. 7C–7D, the planter component 437 in the second, preferred embodiment of the invention, like the first, preferred embodiment, comprises first and second seed/fertilizer conduits 440, 441, configured to place seed and fertilizer, respectively, in a furrow formed by the system, via chutes 438', 438", respectively, situated in the vicinity of, for example, second 438 and first 439 mole plows, respectively.

The seed/fertilizer conduits 440, 441 are enveloped by the first 602 and second 603 side walls forming the lower part of the frame F, so as to prevent migration of dirt within the furrow into the chutes, clogging same.

The mole plows widen and grind at the sidewall, while causing soil to be displaced to allow fertilizer and seed to be deposited into the seed bed. The mole plows also act as shearing bars to both the of the sidewalls of the furrow, scraping and forming the furrow wall, working in tandem with the furrow trimming discs to cooperatively shape and provide uniformity to the furrow and seed bed.

As indicated, the coulter is biased or spring loaded so that it may work up and down when encountering obstructions such as roots or rocks, and can be set to slice roots within acceptable size limitations, and the spring tension can be adjusted for cutting through various vegetation.

As shown, the mole plows are staggered to provided seed/fertilizer at varying levels in the furrow; for example, the first 439 mole plow may emanate from the planter component along a horizontal line corresponding with the approximate midpoint of foot shank, while the second 438 mole plow may emanate from the planter component at about the cutting depth of the furrow trimming discs, with the mole plows themselves comprising plow members situated at generally about a forty five degree angle relative to the horizontal (can vary), and configured as is generally practiced in the art. As shown, chute 438' terminates in a pivotally adjustable seed delivery chute 439', which is adjustable 201 via support bar 450 which engages the frame F of the unit, which would allow the adjustment of chute 439' angle relative to the furrow for delivery of seed, which adjustment would depend upon the type of crop planted, soil conditions, and other factors. A nylon sleeve N is provided to adjustable conform with the rear of the adjustable chute, so insure that the seed traverses smoothly into the adjustable chute from the main chute 438'.

Side plate structures 600, 601 comprising the lower side walls of frame F 602, 603 emanating from the base of seed conduit 440 retain the soil in an open position for pivotally adjustable seed delivery chute 439', so as to provide a void in the furrow for the deposit of seed by chute 639', and prevent clogging of same by soil. This allows the seed delivery chute to place the seed at a deepest point the in the present, exemplary embodiment of about 1¼" deep. When the seed delivery chute 439 is moved to a position behind the side plate structures the soil is allowed to first fill in the furrow before the seeds are dropped or place in the now shallower furrows, therefore placing and covering seed at a shallower depth.

It is noted that the present implement may be mounted upon a frame conveying a plurality of such implements aligned in parallel fashion, and may be pulled by a tractor at a normal exemplary operating a range of 4–6 miles per hour, or 3–6 miles per hour with a smaller tractor.

In use, the present, second preferred embodiment operates as the preferred embodiment supra, with the added feature of first and second trimming discs to trim the first and second edges of the furrow, while cutting into the side walls of the furrow in an angled fashion, so as to further settle the tilth within the furrow and seedbed, followed by a firming wheel which flattens the trimmed and uniform furrow. Also provided is the enhanced planter capability for depositing fertilizer and seed strategically at the bottom and medial portion of the seedbed, respectively, with the bottom of the seed chute being interfaced with the trimming discs or firming wheel so as to adjust depth for obstructions. Further, the trimming discs are self cleaning for nominal maintenance and consistency in operation, via their angled positioning and disparate diameters. The depth drum provided with the first trimming disc provides a means of maintaining the desired depth of cut not only for the first trimming disc, but also the second disc by pivotal frame communication with the main frame.

Returning to FIG. 7B in use, the implement 508 of the present invention is mounted to a main frame 514 configured to support a plurality 508, 509, 510, 511 of such implements in parallel, spaced relation (for example, 13" to 15"), with the implements staggered relative the other. For example, implement 509 is staggered forward 513 of implement 508 eight inches 512 in the preferred embodiment, while implement 510 is staggered rearward of implement 501 by eight inches, and implement 511 is staggered forward of implement 510 by eight inches, and so on, each implement preparing a separate furrow. Preferably, the forward first and second coulters of all of the implements would remain aligned, with the rearwardly staggered implements 508, 510 having a longer main frame spacing between the forward first and second coulters and the ripping point, so as to space the ripping point and implements there behind 8" behind the forwardly staggered implements 509, 511.

The primary benefit of staggering the implements is that, in use, the ground cover between the rows, which may be spaced 13–15" inches apart via the spacing of the implements, is undisturbed on the surface, but below the surface, the sod/soil is fractured by the staggering of the implements, including primarily the ripping point of each implement, by the amount indicated above (preferred embodiment 8"). Accordingly, water, fertilizer, nutrients to feed the entire ground area are more readily distributed, while simultaneously facilitating more even distribution of water, fertilizer nutrients from one furrow to the next, renovating the soil, and feeding all of the root system of any plants in the furrows. A tractor pulling the main frame would then prepare as many furrows as there are implements provided upon the main frame.

The latest improvement of the invention is believed to provide a truly useful and revolutionary system for minimum tillage planting and renovation.

The invention embodiments herein described are done so in detail for exemplary purposes only, and may be subject to many different variations in design, structure, Application and operation methodology. Thus, the detailed disclosures therein should be interpreted in an illustrative, exemplary manner, and not in a limited sense.

What is claimed is:

1. An enhanced minimum tillage planter/renovator system for preparing a strip of ground comprising soil having an upper surface, comprising:
    a foot shank having a forwardly oriented ripping point, a lifting edge situated behind said ripping point, and a spreading area situated above said lifting edge, said foot shank for lifting said soil from said ground, providing displaced soil while forming a seed bed void;
    a first coulter situated in the vicinity of said foot shank, said first coulter configured to engage at least a portion of said displaced soil;
    a second coulter situated in the vicinity of said foot shank, said second coulter configured to engage, sever, and chop, in concert with said first coulter, said displaced soil;
    said first and second coulters cooperatively engaging, severing and chopping said displaced organic ground cover, effectively breaking apart said displaced soil in such a manner as to form tilth, while allowing said tilth to be redeposited into said seed bed, while forming a furrow having first and second edges at the upper surface of the ground.

2. The invention of claim 1, wherein there is further provided first and second trimming discs for trimming said first and second edges of said furrow, after said foot shank, in cooperation with said first and second coulters, has formed said furrow, said first and second trimming discs for providing a trimmed furrow.

3. The invention of claim 2, wherein said first trimming disc has a larger diameter than said second trimming disc, and wherein said first trimming disc includes a depth drum for controlling the depth of penetration of said first and second trimming discs into the ground.

4. The invention of claim 3, wherein said first and second trimming discs are situated at opposing angles from one another.

5. The invention of claim 4, wherein said first and second trimming discs are situated at an opposing four degree angle relative to vertical.

6. The invention of claim 5, wherein said first and second trimming discs are situated at an opposing one degree angle relative to horizontal.

7. The invention of claim 6, wherein there is further provided a firming wheel for firming the formed furrow, so as to smooth said trimmed furrow to about ground level.

8. The invention of claim 7, wherein there is further provided a feeder chute having an opening formed within said seed bed, said feeder chute configured to provide seed into the seed bed.

9. The invention of claim 8, wherein there is further provided a mole plow situated adjacent to said opening formed in said feeder chute, said mole plow configured to form an opening in said seed bed for the deposit of seed therein.

10. An enhanced minimum tillage planter/renovator system for preparing a strip of ground comprising soil having an organic ground cover, comprising:
    a foot shank having a lifting edge, and a spreading area situated above said lifting edge, said foot shank for lifting said displaced soil and organic ground cover situated above said displaced soil, providing displaced organic ground cover;
    a first coulter situated in the vicinity of said foot shank, said first coulter configured to engage at least a portion of said displaced organic ground cover,
    a second coulter situated in the vicinity of said foot shank, said second coulter configured to engage, sever, and chop, in concert with said first coulter, said displaced organic ground cover;
    said first and second coulters for engaging, severing and chopping said displaced organic ground cover, effectively breaking apart said displaced organic ground cover in such a manner as to form tilth, while allowing said tilth to be redeposited so as to form a furrow having first and second edges at the upper surface of the ground;
    first and second cutting discs for trimming said first and second edges of said furrow, respectively.

11. The invention of claim 10, wherein there is further provided a firming wheel for firming the formed furrow, so as to smooth said trimmed furrow to about ground level.

12. The invention of claim 11, wherein said first trimming disc has a larger diameter than said second trimming disc wheel, and wherein said first trimming disc includes a depth drum for controlling the depth of penetration of said first and second trimming discs into the ground.

13. The invention of claim 12, wherein said first and trimming discs are situated at opposing angles from one another.

14. The invention of claim 13, wherein said first and second trimming discs are situated at an opposing four degree angle relative to vertical.

15. The invention of claim 14, wherein said first and second trimming discs are situated at an opposing one degree angle relative to horizontal.

16. The method of preparing a strip of ground comprising soil having an upper surface, comprising the steps of:
    a. providing a minimum tillage renovator, comprising:
        a foot shank having a forwardly oriented ripping point, a lifting edge situated behind said ripping point, and a spreading area situated above said lifting edge, said foot shank for lifting said soil from said ground, providing displaced soil while forming a seed bed void;
        a first coulter situated in the vicinity of said foot shank, said first coulter configured to engage at least a portion of said displaced soil,
        a second coulter situated in the vicinity of said foot shank;
        said first and second coulters cooperatively engaging, severing and chopping said displaced organic ground cover, effectively breaking apart said displaced soil in such a manner as to form tilth, while allowing said tilth to be redeposited into said seed bed, while forming a furrow having first and second edges at the upper surface of the ground;

b. pulling said minimum tillage renovator forward, allowing said ripping point to penetrate said soil, while allowing said lifting area of said foot shank to lift said soil, and said spreading area of said foot shank to spread said soil, so as to provide displaced soil while forming a seed bed void;

c. said first and second coulters cooperatively rotating and engaging said displaced soil, grinding said displaced soil, so as to form tilth;

d. redepositing said tilth into said seed bed void formed in said ground; and e. trimming said first and second edges of said furrow to form a trimmed furrow.

17. The invention of claim 16, after step "a", the additional step of providing first and second trimming discs for trimming said furrow, and the additional step after step "c" of said first cutting disc rotating at a faster revolution than said second cutting disc so as to prevent the accumulation and clogging of debris between said first and second trimming discs.

18. The invention of claim 17, wherein there is provided the additional step after step "a" of providing a firming wheel, and wherein there is provided the additional step "e" of applying said firming wheel so the surface of said furrow under bias to flatten said furrow.

19. An enhanced minimum tillage planter/renovator system for preparing a seedbed and furrow in a strip of ground comprising soil having an upper surface, comprising:

ripping means for penetrating the ground at a generally consistent depth below the upper surface, forming displaced soil, forming a furrow having first and second edges, lifting means associated with said ripping means for lifting said displaced soil;

grinding means for engaging, severing and chopping said displaced soil, effectively breaking apart said displaced soil in such a manner as to form tilth, said grinding means further comprising:

a first coulter situated in the vicinity of said ripping means, said first coulter configured to engage at least a portion of said ground cover displaced by said lifting means, a second coulter situated in the vicinity of said ripping means, said second coulter configured to engage, sever, and chop, in concert with said first coulter, said displaced soil;

trimming means for trimming said first and second edges of said furrow; and redeposit means for depositing said tilth into said furrow.

20. The enhanced minimum tillage planter/renovator system of claim 19, wherein said first and second coulters forming said grinding means have an outer diameter, and said outer diameter of said first and second coulters are rippled.

21. The enhanced minimum tillage planter/renovator system of claim 20, wherein said ripping means comprises a foot shank having a ripping point, and wherein said lifting means comprises a front face on said foot shank configured to guide said displaced soil and organic ground cover towards said first and second coulters.

22. The enhanced minimum tillage planter/renovator system of claim 21, wherein there is further provided a support member supporting said first and second coulters, said support member configured to pivot forward to further space said first and second coulters from said foot shank, so as to allow for the removal of debris lodged therebetween.

23. The enhanced minimum tillage planter/renovator system of claim 22, wherein said first and second coulters are spaced to form a leading edge situated generally in front of said ripping means, and wherein said first and second coulters are further spaced so as to form a holding area cavity in an area between the coulters placed in their dual angled directions, and generally enclosed by said ripping means, said holding area cavity comprising a grinding area for grinding said displaced soil.

24. The enhanced minimum tillage planter/renovator system of claim 20, wherein said first and second coulters are staggered, wherein a portion of said first coulter leads and is situated slightly below said second coulter.

25. The enhanced minimum tillage planter/renovator of claim 24, wherein said foot shank includes a first and second outer edge and a generally centrally situated leading edge, and wherein there is further provided a generally vertically situated leading slicing coulter situated in leading, offset relationship from said leading edge of said foot shank, said slicing coulter generally aligned with said first outer edge of said foot shank.

26. The enhanced tillage planter/renovator of claim 19, wherein there is further provided a frame having a front and rear end, and wherein there is further provided a planter component situated generally adjacent to said rear end of said frame.

27. The enhanced minimum tillage planter/renovator of claim 26, wherein there is further provided hitch means associated with the front end of said frame, for selectively hitching said frame to motive means for motivating said frame.

28. The invention of claim 19, wherein said trimming means comprises first and second cutting discs for trimming said first and second edges of said furrow, respectively.

29. The invention of claim 28, wherein said first trimming disc has a larger diameter than said second trimming disc wheel, and wherein said first cutting wheel includes a depth drum for controlling the depth of penetration of said first and second trimming discs into the ground.

30. The invention of claim 29, wherein said first and second trimming discs are situated at opposing angles from one another.

31. The invention of claim 30, wherein said first and second trimming discs are situated at an opposing four degree angle relative to vertical.

32. The invention of claim 30, wherein said first and second trimming discs are situated at an opposing one degree angle relative to horizontal.

33. The invention of claim 32, wherein there is further provided a firming wheel for firming the formed furrow, so as to smooth said trimmed furrow to about ground level.

34. An enhanced minimum tillage planter/renovator system for preparing a seedbed and furrow in a strip of ground comprising soil having an upper surface, comprising:

a foot shank having a ripping point configured to penetrate the ground at a generally consistent depth below the upper surface, forming a furrow, said foot shank further comprising a lifting edge configured to lift said soil, so as to provide displaced soil, while forming a furrow having first and second edges;

a first coulter situated generally near said foot shank, said first coulter configured to engage at least a portion of said soil displaced by said foot shank, a second coulter situated generally above said foot shank, said second coulter configured to engage, sever, and chop, in concert with said first coulter, said soil displaced by said foot shank, so as to form tilth;

first and second cutting discs for trimming said first and second edges of said furrow, respectively.

35. The enhanced minimum tillage planter/renovator system of claim 34, wherein said first and second coulters forming said grinding means have an outer diameter, and said outer diameter of said first and second coulters are rippled.

36. The enhanced minimum tillage planter/renovator system of claim 35, wherein there is further provided a support member supporting said first and second coulters, said support member configured to pivot forward to further space said first and second coulters from said foot shank, so as to allow for the removal of debris lodged therebetween.

37. The enhanced minimum tillage planter/renovator system of claim 34, wherein said first and second coulters are spaced to form a leading edge situated generally in front of said ripping point, and wherein said first and second coulters are further spaced so as to form a holding area cavity in an area between the coulters placed in their dual angled directions, and generally enclosed by said foot shank.

38. The enhanced minimum tillage planter/renovator system of claim 35, wherein said first and second coulters are staggered, wherein a portion of said first leads and is situated slightly below said second coulter.

39. The enhanced tillage planter/renovator of claim 34, wherein there is further provided a frame having a front and rear end, and wherein there is further provided a planter component situated generally adjacent to said rear end of said frame.

40. The enhanced minimum tillage planter/renovator of claim 34, wherein there is further provided hitch means associated with the front end of said frame, for selectively hitching said frame to motive means for motivating said frame.

41. The method of forming a seedbed and furrow in a strip of ground comprising soil covered by an organic ground cover, comprising the steps of:

a. using a foot shank having a ripping point, a lifting edge, and a tapered spreading area to penetrate the ground at a generally consistent depth below the ground cover, forming a seedbed void and displaced soil;

b. lifting said displaced soil and organic ground cover situated above said displaced soil, providing displaced soil and displaced organic ground cover;

c. utilizing first and second coulters situated in the vicinity of said foot shank to grind said displaced organic ground cover, forming tilth;

d. depositing said tilth into the formed seedbed void.

42. The method of claim 41, wherein there is further provided after step "a" the additional step of forming a furrow having first and second edges, and, after step "d", the additional step of trimming said first and second edges of said furrow.

43. The method of forming a seedbed and furrow in a strip of ground comprising soil covered by an organic ground cover, comprising the steps of:

a. penetrating the ground at a generally consistent depth below the ground cover, forming a seedbed void and displaced soil;

b. lifting said displaced soil and organic ground cover situated above said displaced soil, providing displaced soil and displaced organic ground cover;

c. utilizing first and second coulters to concurrently grind said displaced organic ground cover, forming tilth d. depositing said tilth into the formed seedbed void.

44. The method of claim 43, wherein there is further provided after step "a" the additional step of forming a furrow having first and second edges, and, after step "d", the additional step of trimming said first and second edges of said furrow.

45. The method of forming a seedbed and furrow in a strip of ground comprising soil covered by an organic ground cover, comprising the steps of:

a. using first and second, parallel, staggered foot shanks, each said first and second foot shanks having a ripping point, a lifting edge, and a tapered spreading area to penetrate the ground at a generally consistent depth below the ground cover, forming first and second, parallel seedbed voids, first and second furrows, and displaced soil, while fracturing the ground between said first and second foot shanks;

b. lifting said displaced soil and organic ground cover situated above said displaced soil, providing displaced soil and displaced organic ground cover;

c. utilizing first and second coulters situated in the vicinity of said first. foot shank, and second and third coulters situated in the vicinity of said third foot shank, to grind said displaced organic ground cover, forming tilth;

d. trimming said furrows; and e. depositing said tilth into the formed seedbed voids.

46. The invention of claim 8, wherein first and second side plates envelope said feeder chute so as to provide an opening in the soil for the deposit of seeds therein, while preventing said soil from clogging said feeder chute.

* * * * *